July 16, 1946.    H. ERNST    2,404,127
SENSITIVE CONTROL MECHANISM
Filed Aug. 2, 1933    6 Sheets-Sheet 1

Inventor
HANS ERNST
By  AHK Parsons
Attorney

July 16, 1946.                    H. ERNST                    2,404,127
                        SENSITIVE CONTROL MECHANISM
                          Filed Aug. 2, 1933                 6 Sheets-Sheet 3

Inventor
HANS ERNST
By AHKParsons Attorney

July 16, 1946.   H. ERNST   2,404,127
SENSITIVE CONTROL MECHANISM
Filed Aug. 2, 1933   6 Sheets-Sheet 4
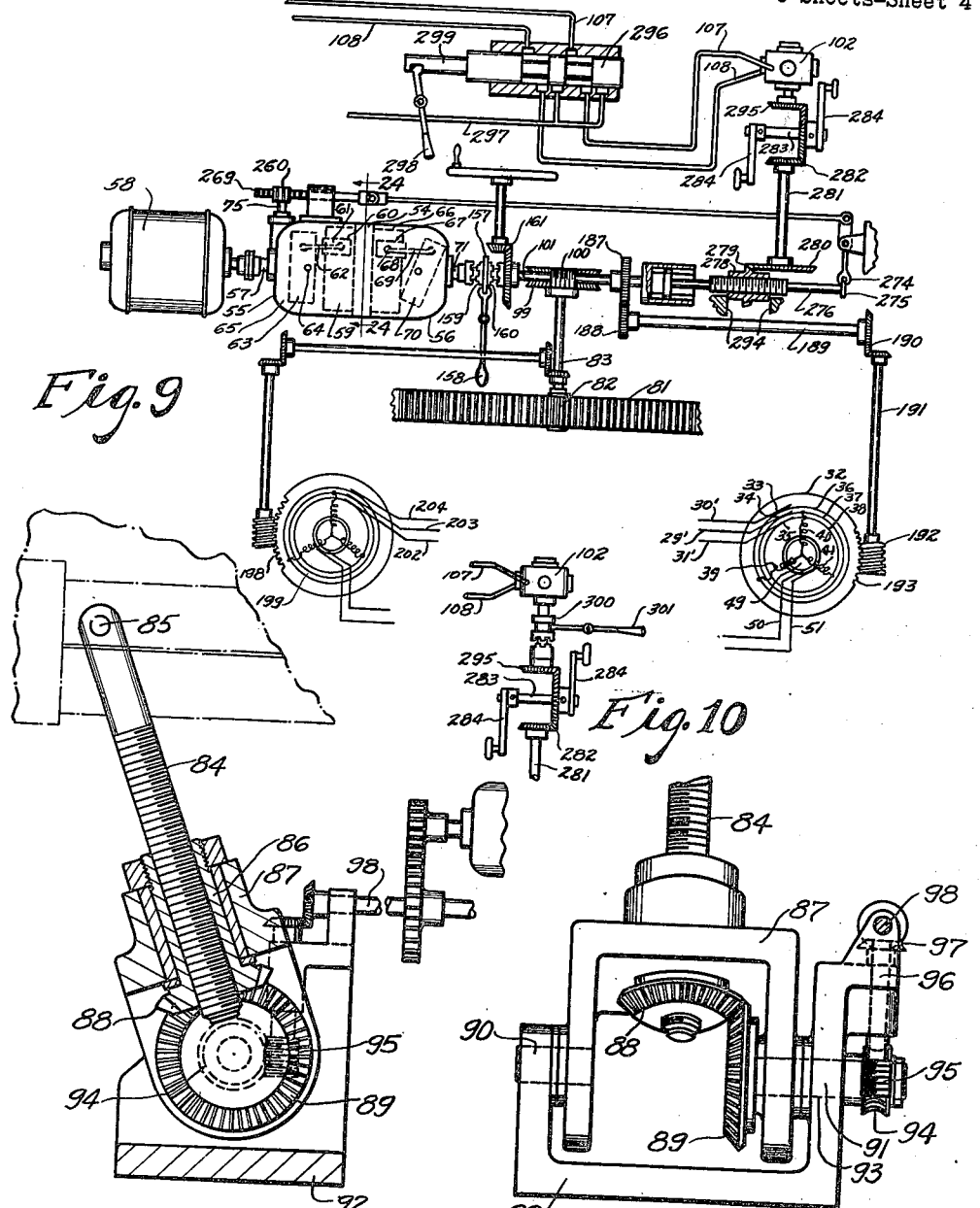
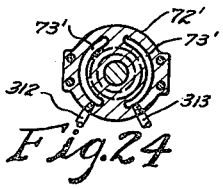
Inventor
HANS ERNST
By AHK Parsons
Attorney July 16, 1946.   H. ERNST   2,404,127
SENSITIVE CONTROL MECHANISM
Filed Aug. 2, 1933   6 Sheets-Sheet 5
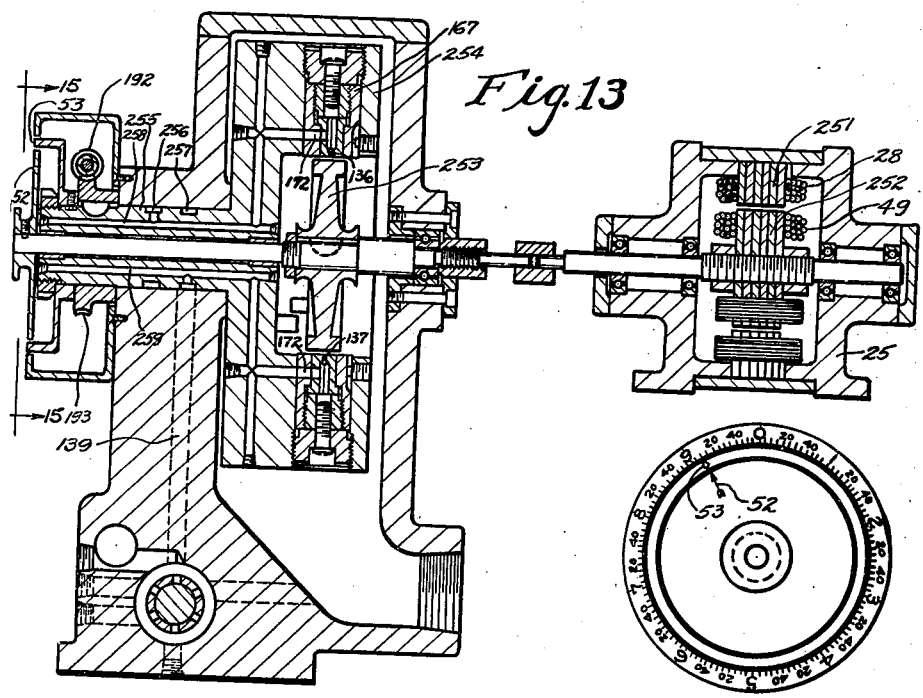
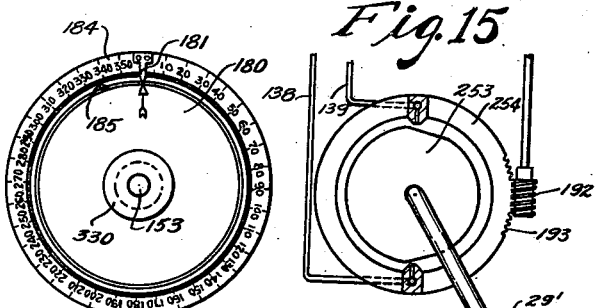
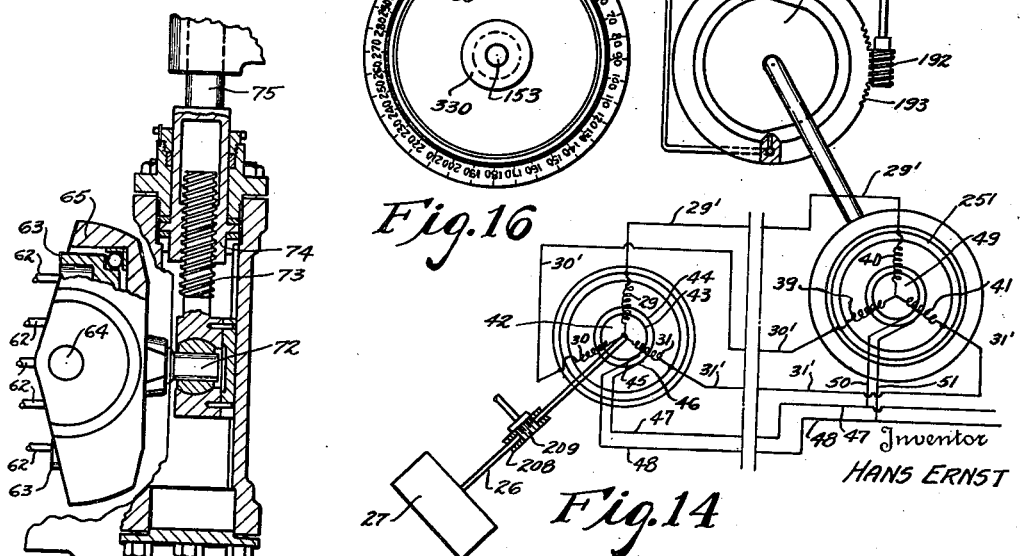
Inventor
HANS ERNST
By H. K. Parsons
Attorney

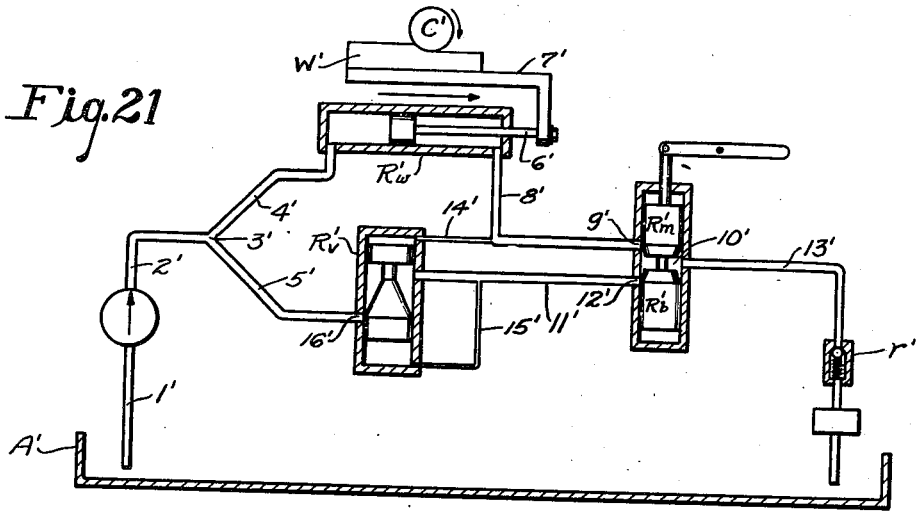
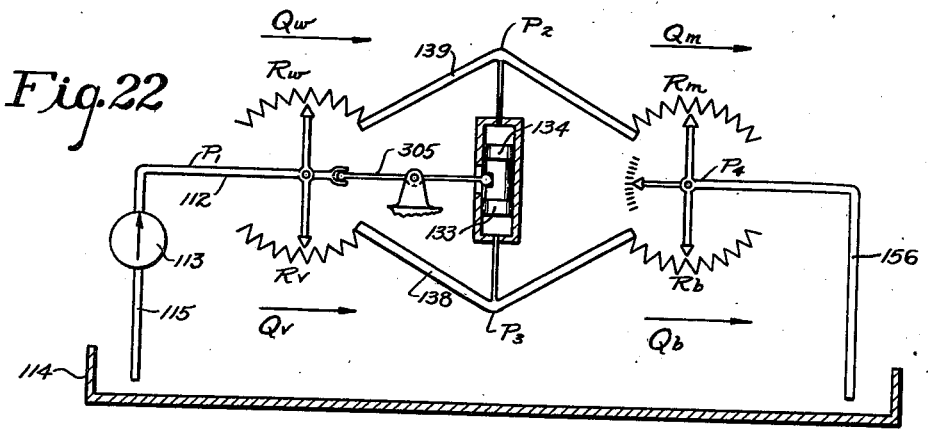
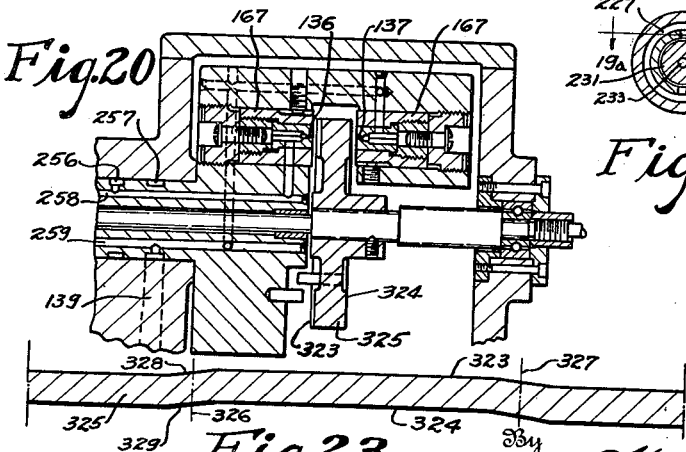
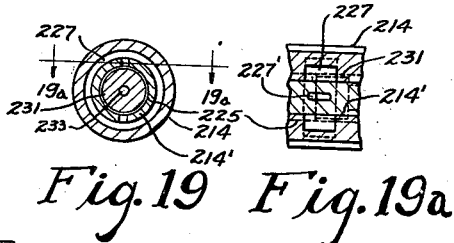

Patented July 16, 1946

2,404,127

UNITED STATES PATENT OFFICE 2,404,127

SENSITIVE CONTROL MECHANISM

Hans Ernst, Cincinnati, Ohio, assignor to The Cincinnati Milling Machine Co., Cincinnati, Ohio, a corporation of Ohio Application August 2, 1933, Serial No. 683,330

70 Claims. (Cl. 89—41)

This invention relates to improvements in sensitive control mechanism and particularly to mechanism of this character which may be advantageously employed in connection with the control of the training or elevation of naval guns or proper determination of azimuth and elevation in connection with anti-aircraft or coast defense artillery weapons.

One of the principal objects of the present invention is the provision of a control mechanism of extreme sensitivity and accuracy, particularly intended for use in connection with or substitution for the turret and gun control mechanisms at present utilized by the land and naval forces.

Another object of the present invention is the provision of a mechanism readily adaptable to and utilizable in conjunction with control mechanisms of the types now employed and which will render possible elimination of manual control of guns and co-ordination of self-synchronous signaling motors and indicators, thus eliminating the inaccuracies due to the human element, reducing the crew required for operation of a given piece or battery and insuring maximum accuracy of gun setting comparable with the instrument determined desired position therefore.

A further object of the present invention is the provision of a novel and improved form of power control mechanism in which the original determinator of direction and amount of adjustment shall be subject to so little friction or opposition to movement as to be capable of operation by and as a part of a standard type self-synchronizing electric motor unit of either the stationary or movable pointer system and which in any event shall accurately transmit to the heavy drive mechanism necessary for attaining the adjustments the exact positional variation indicated and effected by the minute power transmitting electrical signaling system.

Other objects and advantages of the present invention should be readily apparent by reference to the following specification considered in conjunction with the accompanying drawings in which the principles of my invention have been diagrammatically indicated in conjunction with selected structural units particularly adapted for carrying out the principles thereof, but it will be understood that any modifications may be made in the specific structural details chosen for purposes of illustration, within the scope of the appended claims, without departing from or exceeding the spirit of the invention.

Figure 9 is a modified form of one portion of the control circuit shown in Figure 2.

Figure 10 is a modified form of manual control mechanism.

Figure 11 is a sectional view of the gun elevating mechanism shown in Figure 1.

Figure 12 is a detailed view of the elevating mechanism taken on the line 12—12 of Figure 1.

Figure 13 is a modified form of the pressure differentiator shown in Figure 3 with a self-synchronous motor unit of the stationary field type.

Figure 14 is a diagram showing the connections to the device shown in Figure 13.

Figure 15 is an end view of the control dials as viewed on the line 15—15 of Figure 13.

Figure 16 is an end view of the control dials as viewed on the line 16—16 of Figure 8.

Figure 17 is a detail section of the rate and direction determinator of the pump-motor power unit.

Figure 19 is a section on the line 19—19 of Figure 2.

Figure 19a is a section on the line 19a—19a of Figure 19.

Figure 20 is a modified form of pressure differentiator.

Figure 21 is a diagrammatic view illustrating one of the hydraulic principles involved in this invention.

Figure 22 is a simplified diagram of the elements involved in the hydraulic amplification system.

Figure 23 is an expanded sectional view of the differentiator disc of Figure 20 showing the profiling of the opposite faces thereof.

Figure 24 is a section on the line 24—24 of Figure 9.

Figure 1:
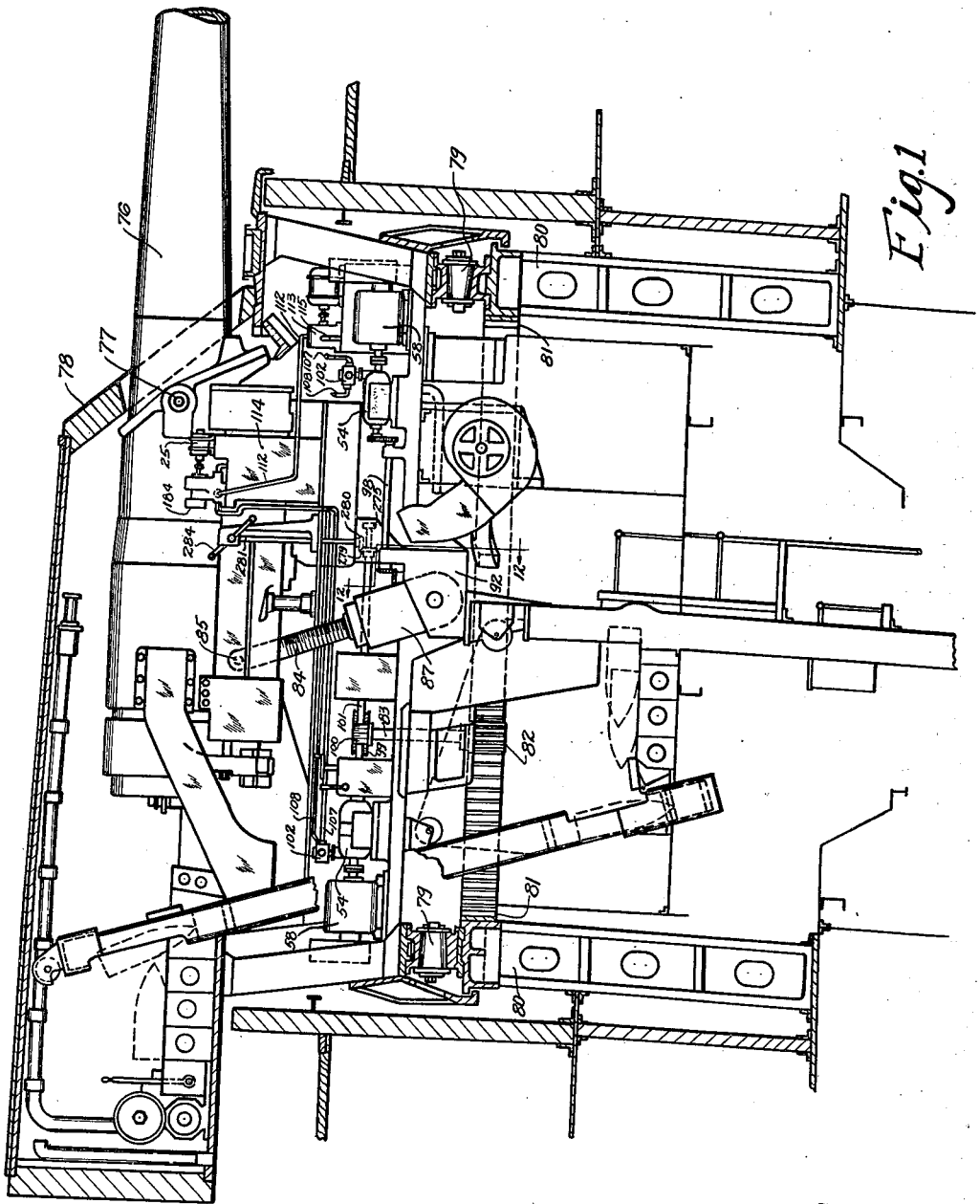
Figure 1 represents a diagrammatic view indicating the general relationship of the parts in an installation of the present invention for control of the training of a naval gun turret and the elevational adjustment of the guns within the turret.

It is conventional gunnery practice among combat forces to depend upon the intelligence and physical force of the gunner in actually effecting the angular position of the gun in its various planes of adjustment in accordance with the signals communicated to him from the fire control stations. With heavy, long-range pieces, such practice may consume valuable time under conditions of stress or emergency; and furthermore since the human element enters into the final setting, the possibility of inaccuracy in the setting is ever present.

This invention contemplates the use of an interponent motive power means which may be substituted for the intelligence and physical force of the gunner and which is so organized that it will be responsive on the one hand to signals received over a communication system from the fire control station which now imparts the range settings to the gunner, and which, on the other hand, has sufficient power to effect the actual physical adjustment of the gun in an accurate and expeditious manner.

In naval gunnery, particularly, there are two different systems of communicating range settings from the remote fire control station to the gun, and indicating their completion, one of which is known as the fixed pointer system, and the other as the movable pointer system. In the first system, a fixed pointer such as 181, Figure 16, is established in convenient position relative to the gun mount together with a movable pointer carried by disc 180 operatively connected by remote control means to the fire control station, at which station suitable means are established for sighting the target and for computing the range which is communicated to the gunner through movement of the pointer 180. As this pointer is rotated by the control station through an indicated angle equal to the desired angular movement of the piece, the gunner actually moves the gun, which in turn will react in a definite manner on the movable pointer at his station to rotate the same in an opposite direction to maintain the same in an alignment with the fixed pointer, and so long as this alignment is maintained, the gun is in the position desired by the control station.

In the other system of communication two movable pointers are utilized, the first one 52, Figure 15, being under the direction of and moved by the fire control station to indicate or signal the angular adjustment desired, and the second one 53 being moved by the gun in response to movement imparted thereto by the gunner, so that the gunner's duties are reduced to the simple proposition of so moving the gun as to maintain the two movable pointers in alignment.

It will thus be seen that in either case there are two relatively movable pointers; that relative movement or separation between them is effected by the fire control station to communicate or signal an angular movement and that realignment of the pointers is effected by movement of the gun through the signalled angle.

A common form of means for communicating motion to the pointer from the fire control station consists of two self-synchronous electric motor devices, of known form, one of which is at the fire control station and may be termed the transmitter and the other at the gun mount which may be termed the receiver. These devices are electrically interconnected, in the manner more particularly shown in Figure 2, whereby any angular movement of one rotor will be imparted to the other rotor. The reference numeral 25 indicates the self-synchronous transmitter at the fire control station, the rotor 42 of which is connected by shaft 26 to the fire control unit 27. The stator 28 of the transmitter may be made up of three legs or poles 29, 30 and 31 which are Y-connected at one end and separately connected at the other to leads 29', 30' and 31' which extend from the fire control station to the receiver motor at the gun mount. In the construction shown in Figure 2, the transmitter 25 has a fixed field, or stator, while the receiver motor 32 at the gun mount has a rotatable field. Therefore in this case the leads 29', 30' and 31' terminate in brushes 33, 34 and 35 riding respectively on the collector rings 36, 37 and 38, these rings being connected in turn respectively to the three field coils 39, 40 and 41 which are also Y-connected.

In the construction shown in Figures 13 and 14, however, both the transmitter and receiver fields are fixed, and thus the leads 29', 30', and 31' are directly connected respectively to the field coils 39, 40 and 41. In each case the rotor 42 is connected by means of collector rings 43 and 44, and brushes 45, and 46, to a pair of leads 47 and 48 constituting a rotor-excitation circuit. The leads 47 and 48 are connected with a suitable source of single phase alternating current and serve to supply current for exciting the rotors. The rotor 49 of the receiver 32 is similarly connected by a pair of leads 50 and 51 to a similar excitation circuit which may be the same power lines 47 and 48. The operation of the device is such that when the excitation circuit is closed, an alternating current voltage is impressed on the rotors of both the transmitter and receiver. Since the receiver rotor is free to turn, it assumes a position similar to that of the transmitter rotor. As the transmitter rotor is turned, the receiver rotor follows at the same speed and in the same direction. The reason for this self-synchronous action is that the single phase current induces voltages in the three legs of each field system. These three voltages are unequal in magnitude and vary with the position of the rotor. When the two rotors are in exactly corresponding positions, the voltages induced in the transmitter field are equal and opposite to those induced in the receiver field; that is, they are balanced, so that no current flows in either field winding.

If, however, the transmitter rotor is moved from the original position, the induced voltages are no longer equal and opposite, and current flows in the field windings. This current flow sets up a torque tending to turn the receiver rotor to the synchronous position relative to its field. This position corresponds to the new position of the transmitter rotor relative to its field.

Thus, if the transmitter rotor is moved, whether mechanically by gears or manually by an operator for a signaling or control operation, the receiver rotor immediately assumes a similar position relative to its field.

If now, the rotor 49 is operatively connected to a pointer such as 52, as more particularly shown in Figures 13 and 15, it will be seen that any movement imparted to the shaft 26 by the fire control unit will effect rotation of the pointer 52.

Further, if a second pointer, such as 53, is operatively connected to a gun, so as to be responsive to angular movement thereof and to move simultaneously through the same indicated angle that the gun moves, it will be apparent that by keeping the two pointers in alignment the angular position of the gun will always be in accordance with the position desired by the fire control station. The rotor 49 and pointer 52 thus constitute a receiver of the communication system through which the gunner receives his instructions for changing the azimuth or elevation of the gun.

As previously pointed out, this invention contemplates the substitution of an organized power control means for the intelligence and physical effort of the gunner, which control means may be connected on the one hand to the receiver of the communication system for response to signals received thereby, and, on the other hand, to the gun adjusting mechanism, in such a manner that upon reception of a signal as witnessed by the slightest movement of a pointer, the required gun adjustment will immediately be power effected; and the fact that this adjustment has been made will be evidenced by a return signal from the gun in the form of pointer movement depending upon the pointer system being utilized.

The chief elements of this sensitive power control mechanism comprise a large motive power unit capable of developing the necessary torque to perform the physical work of translating or elevating the gun, and an hydraulic control system operatively coupling the receiver of the communication or signaling system for control of the power unit and capable of starting, stopping, and determining the rate and direction of movement thereof and thereby of the gun. The actual connection to the receiver rotor 49 is by an hydraulic amplification system of the pressure differential type comprising a part which is very light and sensitive to movement and may therefore be directly connected to the receiver rotor for movement thereby without imposing any appreciable load on it, or in any way acting to retard its free movement. It is obvious that for complete control of the gun in a given plane, the power unit must be capable of being started and stopped, as well as subject to reversal and change of rate in either direction, and that all of these functions should preferably be combined for control by a single unit for simplicity.

A power unit which best satisfies these requirements is a hydraulic variable speed transmission gear composed of a variable speed pump unit, a motor unit and a single control member for obtaining all of the various functional adjustments. Such hydraulic devices are well known and therefore are only conventionally illustrated. The reference numeral 54 in Figure 2 indicates a known form of hydraulic variable speed transmission gear, the operative principle of which is the same as that shown in Patent No. 924,787 issued to R. Janney, having a pump end 55 and motor end 56. The pump end comprises a rotatable shaft 57 which may be continuously rotated by suitable means such as an electric motor 58. A cylinder barrel 59 is keyed to the shaft 57 for rotation therewith and has a plurality of cylinders 60 formed therein, each containing a reciprocable piston 61. The pistons are connected by piston rods 62 to a swash plate 63 which is supported by the shaft 57 not only for rotation therewith but also for movement about an axis 64 at right angles to the axis of the shaft. An angle box 65, Figure 17, is trunnioned behind the swash plate 63 for movement about an axis coaxially with the axis 64 for varying the angular position of the swash plate relative to the plane of the cylinder block 59 so that upon rotation of the shaft 57 the pistons 61 will be caused to reciprocate in the cylinders 60. It will be evident that when the swash plate 63 is parallel to the cylinder block 59 or in other words in a position as shown in Figure 2, that rotation of the shaft 57 will not impart any reciprocating movement to the pistons 61, and therefore no fluid will be pumped to the motor unit and the parts will be at rest except for the continuous rotation by the electric motor.

The motor unit is similar to the pump unit in that it has a cylinder block 66 in which is formed a plurality of cylinders 67 similar to the cylinders 60 and each cylinder has a piston 68 operatively connected by a piston rod 69 to a second swash plate 70. This swash plate is supported upon an output shaft 71, but usually at a predetermined angle thereto, all adjustment being taken care of in the pump unit. A medial plate 72' separates the cylinder blocks and has a pair of arcuate shaped openings 73', Figure 24, one of which serves to deliver fluid under pressure from the pump cylinders to the motor cylinders to cause outward movement of the contained pistons, and the other to return fluid to the pump, from the motor cylinders during the inward movement of their pistons; the function of these openings being reversed upon reverse operation of the pump.

Figure 2:
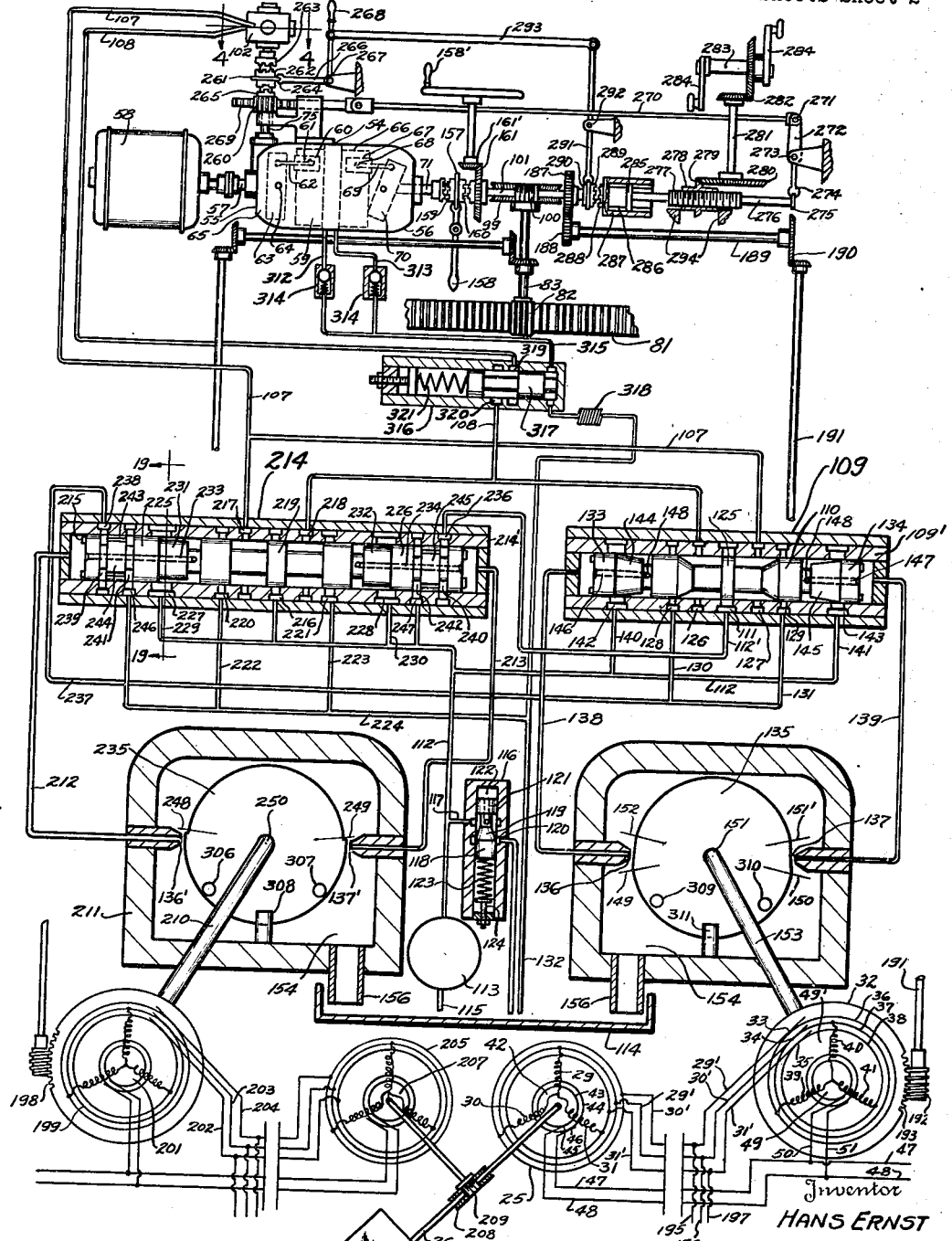
Figure 2 is a detailed diagrammatic view of the high speed approximate adjustment and the minute or more accurate final adjusting circuits and the self-synchronous devices as utilized for effecting adjustment of the piece either for azimuth or for elevation.
Figure 3:
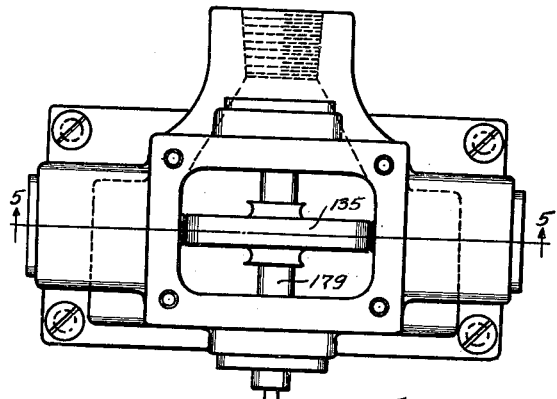
Figure 3 is a plan view of one form of the pressure differentiator for the hydraulic amplification control circuit.

When the plate 63 is adjusted counterclockwise from the position shown in Figure 2, the pump will deliver fluid to the motor in such a direction as to cause rotation of the shaft 71 in one direction, while if it is adjusted counterclockwise, the direction of rotation will be reversed. Also, the angle of adjustment of the swash plate 63 determines the speed of rotation of the motor unit, a slight angular adjustment imparting a slow rate of speed, while a large angular adjustment will impart a high rate of speed.

The angle block 65 is provided with an adjusting arm which may be actuated directly by a reciprocating member through a piston and cylinder, but for accurate and minute adjustment, it is preferable that it be connected by means of a screw and nut to its actuator in the manner shown in Figure 17. The arm 72 may be connected to a threaded member 73 passing through a nut member 74 secured to the end of a rotatable shaft 75. The pitch of the screw and nut may be such that a partial rotation of the shaft 75 to either side of a central position will effect the complete range of adjustment of the swash plate.

The manner of assembling this power unit with a gun mount is more particularly illustrated in Figure 1 which shows a typical form of turret such as used on naval vessels. The gun 76 is pivotally mounted on trunnions at 77 in the turret for elevation and the turret 78 is supported as by a plurality of tapered rollers 79 on the hull structure 80 of the vessel for rotation in a horizontal plane to train the gun. The training mechanism usually comprises an internal gear 81, which is fixed to the structure 80, and has meshing therewith a large pinion gear 82 supported on the end of the depending rotatable shaft 83 carried by the turret.

Elevation of the gun may be effected by a mechanism such as shown in Figures 11 and 12, comprising a large screw 84, pivotally connected at 85 to the breach end of the gun a considerable distance from the trunnion 77. The screw 84 passes through a nut 86, which is rotatably mounted in pivoted bracket 87, and has integrally secured to one end a bevel pinion 88 meshing with a bevel gear 89. The bracket 87 is trunioned at 90 and 91 in a bifurcated fixed support 92. The bevel gear 89 is secured to the end of a shaft 93 which passes through the center of one of the trunnions and has secured to the outer end a worm gear 94 meshing with a worm 95. The worm 95 is secured to a shaft 96 which is connected through bevel gearing 97 to a horizontal operating shaft 98. It will now be seen that rotation of the shaft 98 will cause through the interconnecting mechanism, rotation of the bevel gear 88 and its integral nut 86 and thereby axial movement of the screw 84. This axial movement will cause elevation or depression of the gun, and as the same moves upward or downward, the bracket 87 will automatically angularly adjust itself about its trunnions. The shaft 83 of the training mechanism is also connected by a worm wheel 99 and a worm 100 to a horizontal driving shaft 101.

In the past each of these shafts 98 and 101 have been operatively connected to manual control means for operation by the gunner. By the present invention, each of these shafts is provided with a power unit 54 operatively connected thereto and an independently operable automatic control system for each unit. In other words, there may be two separate independent automatic control systems, one of which may be a duplicate of the other and therefore only one will be described. For the sake of economy, or simplicity of construction, however, where functional requirements permit, certain of the elements may be common to both systems. Furthermore, if the fire control unit is of such a construction that it provides a master controller for both systems, it is obvious that their independence will apply to their operative functions only.

Figure 4:
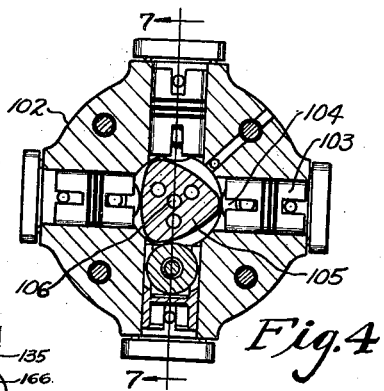
Figure 4 is a section through the pump adjustment control motor as on the line 4—4 of Figure 2.
Figure 7:
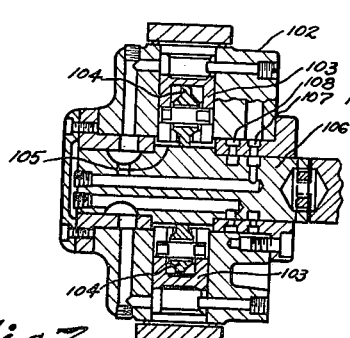
Figure 7 is a section on the line 7—7 of Figure 4.

Rotation of the power unit control shaft 75 is effected by a hydraulic motor 102 which may comprise, as shown in Figures 4 and 7, a plurality of pistons 103 carrying anti-frictionally mounted rollers 104 on the inner end thereof engaging a multiple lobe cam 105 carried by a rotatable shaft 106. Although a rotatable type motor has been shown, it is obvious that a double acting cylinder and piston type motor could be used, either to cause a rotation of the pump control shaft 75 as by means of a rack and pinion, or else to actuate the swash plate 63 directly, as heretofore mentioned. In either case two pipes 107 and 108 supply fluid to the motor and are so connected thereto that when pressure is supplied through pipe 107, and pipe 108 is connected to exhaust, the motor will cause movement of the swash plate 63 in one direction, and when pressure is supplied through pipe 108, and pipe 107 is connected to exhaust, the motor will cause movement of the swash plate in the opposite direction; while if pipes 107 and 108 are both kept under an equal pressure, the motor will stop and be held in any given angular position. A valve mechanism has been provided for controlling the flow in these pipes, and although two valves, such as 109 and 214, are shown in Figure 2, in its simplest form and for limited purposes only, the invention may be practiced by the use of only one valve.

Figure 5:
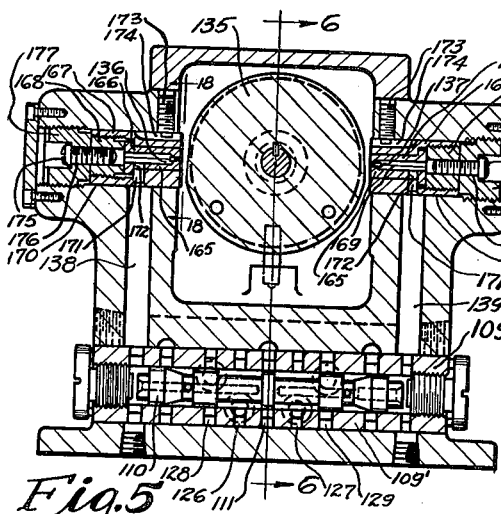
Figure 5 is a section on the line 5—5 of Figure 3.

This valve may comprise a fixed sleeve 109′, as more particularly shown in Figures 2 and 5, having a reciprocable plunger 110 contained therein.

The sleeve has an annular pressure groove 111 formed therein to which is connected the pressure channel 112′, the pressure fluid being supplied by a pump 113. A reservoir tank 114 is provided from which fluid is withdrawn through a pipe 115 by the pump 113. In order to maintain constant pressure in the pump delivery line 112, a relief valve 116 is connected thereto by the branch line 117. A plunger 118 is reciprocably mounted in the valve and has a spool 119 which controls the flow through the exhaust port 120. The pressure in line 117 is connected by an axial bore 121 in the plunger to the end 122 of the valve housing to normally force the valve in a direction to increase the volume of the escaping flow. This movement is opposed, however, by a spring 123, the opposition of which may be adjusted by the set screw 124. By this means the spool 119 may be adjusted and maintained to prevent variation of pressure in line 112.

The plunger 110 has a spool 125 formed thereon which may be of sufficient width to close the radial holes formed in the bottom of the groove 111 and thereby prevent flow to either annular groove 126 or 127 to which the pressural control channels 108 and 107 are connected. Flanking grooves 126 and 127 are another pair of grooves 128 and 129 which may be connected by branch lines 130 and 131 to a common return line. It will now be seen that if the plunger 110 is moved from the position shown in Figure 2 toward the left, that pressure will flow from channel 112′ to channel 107 and that the channel 108 will be connected to the exhaust channel 130; or if moved to the right the channel 112′ will be connected to channel 108 and channel 107 will be connected to the exhaust line 131. Thus by movement of the valve plunger 110 to the right or left the direction of rotation of the shaft 75 can be controlled, and furthermore that the rate of this rotation may be determined by the amount that the plunger 110 is moved off center.

The shifting of this valve plunger is controlled through a relay in the form of a sensitive hydraulic amplification system, which is responsive to movement of the rotor 49 on the one hand which, as previously explained, is the receiver of the communication system; and to the movement of the gun on the other hand. The hydraulic amplification system comprises a means for magnifying the movement and power output of the rotor so that a very slight weak movement thereof will effect sufficient opening of the valve 110 to develop a strong force for controlling operation of the hydraulic variable speed transmission gear. The valve plunger 110 is moved by a pair of piston portions 133 and 134 formed on opposite ends of the plunger, and actual movement is effected by unbalancing the opposing forces on the pistons by a pressure differentiator 135 which may be in the form of a disc rotatable relative to a pair of ports or jets 136 and 137 which are respectively connected by channels 138 and 139 to opposite ends of the valve plunger 110.

When a pressure differential is created by the disc 135, the plunger 110 will be moved and will continue to move until a pressure equilibrating means has re-equalized the pressures on opposite ends of the plunger. Fluid for this purpose is continuously supplied from channel 112 through branch lines 140 and 141 which are respectively connected to annular grooves 142 and 143 formed in the sleeve 109′. Carried by and movable with the valve plunger 110 are variable resistance portions which may be in the form of tapered spools 144 and 145 associated with the elongated radial ports formed on the bottoms of grooves 142 and 143. These spools are so dimensioned with respect to the ports that when the plunger 110 is in its mid-position, the resistances to escape of fluid from the grooves 142 and 143 are exactly equal.

Holes 146 and 147 are drilled in opposite ends of the plunger and connected by radially drilled holes 148 to the annular space adjacent to the spools 144 and 145. The fluid from the channel 112 is thus connected through the branch lines 140 and 141, the hydraulic resistances formed by the spools 144 and 145, and the drilled holes in opposite ends of the plunger to the cylinder portions formed at opposite ends of the sleeve 109. The fluid then flows from these cylinder portions through channels 138 and 139 to be discharged at the ports 136 and 137 against the periphery of the disc 135.

This disc has a circular peripheral portion extending from the point 149 counterclockwise to the point 150, and of a radius equal to the distance from the center 151 of the disc to the faces of the ports 136 and 137 minus a few thousandths of an inch clearance. The included angle measured from the point 149 counterclockwise to the point 150 is a few degrees less than 180 degrees. The disc has also a concentric peripheral portion extending from the point 151' counterclockwise to the point 152 which has a radius of a few thousandths less than the radius of the portion 147—150. The included angle measured from the point 151' counterclockwise to the point 152 is likewise only slightly less than 180 degrees. The points 149 and 152 as well as the points 150 and 151' are connected by a profiled portion which has a continually decreasing radius so as to provide a resistance to the flow of fluid through the ports 136 and 137 which will vary with the angular position of the disc. When the angular position of the disc is such that the spaces between the ports and the respective profiled positions are equal, as shown in Figure 2, the resistance to flow of fluid therethrough will likewise be equal.

The disc 135 is mounted on the shaft 153 which is co-axial with rotor 49 and permanently connected therewith so that the slightest movement thereof will cause rotation of the disc. The fluid discharging from the ports 136 and 137 is collected in the chamber 154 formed in the bottom of the housing 155 and discharged freely through a suitable channel 156 to the reservoir 114.

From the foregoing it will be evident that, if the valve plunger 110 and the disc 135 are both in their respective mid-positions, there will be two parallel paths of equal total resistance for the fluid to traverse from the supply channel 112 to the chamber 154. Thus the quantity of fluid flowing through these two paths will be equal, and as the resistances at the ports 136 and 137 are themselves equal, the pressures in the channels 138 and 139 will also be equal, and the valve plunger 110 will thus tend to remain in its mid-position.

If we now assume that the disc 135 is rotated through a small angle in a counterclockwise direction, the resistance to outflow of fluid from the port 137 will be increased while the resistance at the port 136 will be decreased. If the plunger 110 could meanwhile be held in its mid-position so as to retain the initial equal values of the resistances to flow past the spools 144 and 145, it is clear that the total resistance of the path from the constant pressure channel 112 through the port 137 will be higher than that through the port 136, and thus the quantity of fluid flowing through 136 will be higher than through 137. But this higher quantity also flows through the resistance formed by the spool 144, and the lower quantity flows through the resistance formed by the spool 145, and as these resistances are being maintained equal, as above stated, then the pressure drop past the spool 144 will be higher than that past the spool 145. Therefore, as the pressure in the channel 112 is maintained at a constant value, the pressure in the channel 139 will be higher than that in the channel 138, and so there will be a pressure differential acting upon the valve plunger 110 tending to move it toward the left. If we now assume that this plunger is not held but is free to move, as is actually the case, it will be moved to the left by this pressure differential. Movement toward the left, however, will decrease the value of the resistance past the spool 144, and increase the resistance past the spool 145. The decrease and increase of these resistances will respectively decrease and increase the total resistances of the two parallel flow paths from channel 112 to chamber 154, thereby further increasing and decreasing the respective flows therethrough. Increase and decrease, respectively, of the flow through the resistances past the ports 136 and 137 will cause a respective rise and fall in the pressure drop across these ports, and consequently a rise and fall, respectively, in the pressures in the channels 138 and 139. This rise and fall, it will be noted, is in the opposite direction to the change in pressure produced by the movement of the disc 135, thus it is evident that continued movement of the plunger 110 to the left will eventually bring about a re-equalization of pressure in these channels and thus a cessation of movement of the plunger.

With this device, therefore, every increment of movement of the disc 135 will cause a corresponding increment of movement of the plunger 110. As the increment of movement of the latter is limited in each case to the amount required to bring about a re-equalization of pressure upon its ends and this in turn is determined by the change in resistance past the spools 144 and 145, any desired relation between these increments, i. e., any desired amplification, can be obtained by providing the proper rate of change of resistance with motion of the spools 144 and 145 in relation to the rate of change of resistance by motion of the disc 135.

The above described principle of operation will be more readily understood by reference to Figure 22 which is a diagrammatic representation of the hydraulic resistances and control elements involved and arranged in simple form to facilitate mathematical analysis of the underlying relations.

In this figure $R_b$ and $R_m$ respectively represent the instantaneous values of the hydraulic resistances between the ports 136 and 137 and the adjacent profiled portions of the disc 135, while $R_v$ and $R_w$ respectively represent the instantaneous values of the resistances formed by the spools 144 and 145; $Q_b$, $Q_m$, $Q_v$ and $Q_w$ represent the quantities, or rates of flow, through the resistances $R_b$, $R_m$, $R_v$, and $R_w$; $P_1$ is the pressure in the supply channel 112, $P_2$ and $P_3$ the pressures in the channels 139 and 138, and $P_4$ the pressure in the collecting chamber 154, (usually atmospheric pressure). The link 305 illustrates the mechanical connection between the piston portions 133 and 134 and the variable resistance spool portions 144 and 145.

If we express the resistances $R_b$, $R_m$, $R_v$, and $R_w$ in terms of the opposition or reaction to unit flow under the conditions encountered in each particular case, then the pressure drop across each resistance will be equal to the quantity or rate of flow, through the resistance, multiplied by the value of the resistance itself or $P=QR$. Thus we may write:

$$P_1-P_2=Q_wR_w$$
$$P_1-P_3=Q_vR_v$$
$$P_2-P_4=Q_mR_m$$
$$P_3-P_4=Q_bR_b$$

But if $P_1-P_2$ is not equal to $P_1-P_3$, then $P_2$ and $P_3$ will themselves be unequal and thus the piston portions 133 and 134 will be moved toward the end acted upon by the lower pressure. Such movement, however, will cause a change in the values of the resistances $R_v$ and $R_w$ in such a direction as to make $P_2$ equal to $P_3$.

When $P_2$ is equal to $P_3$, $P_1-P_2$ will be equal to $P_1-P_3$, and $P_2-P_4$ must then be equal to $P_3-P_4$, therefore $Q_wR_w$ must equal $Q_vR_v$, and $Q_mR_m$ must equal $Q_bR_b$. Furthermore, when pistons 133 and 134 are stationary, $Q_w$ must equal $Q_m$, and $Q_v$ must equal $Q_b$, thus we may write:

$$Q_mR_w=Q_bR_b \text{ and } Q_mR_m=Q_bR_b$$

Therefore $$\frac{Q_m}{Q_b}=\frac{R_v}{R_w} \text{ and } \frac{Q_m}{Q_b}=\frac{R_b}{R_m}$$

and thus $$\frac{R_b}{R_m}=\frac{R_v}{R_w}$$

whenever $P_2=P_3$, that is, whenever the system is in equilibrium.

Thus any movement of the disc 135, which causes a change in the resistance ratio $$\frac{R_3}{R_m}$$

will bring about a movement of the valve plunger 110 which will continue until the resistances past the spools 144 and 145 will have assumed such values that the ratio $$\frac{R_b}{R_w}$$

will be equal to the new value of the ratio $$\frac{R_b}{R_m}$$

It will thus be seen that this device is in effect a self-regulating hydraulic Wheatstone bridge, similar in principle to that disclosed in co-pending application, Serial #490,154, filed October 21, 1930, by Hans Ernst, et al., Figure 10 of which application is reproduced here as Figure 21 for the purposes of comparison with Figure 22; the only change made from the original is that the original reference numerals have been primed for obvious reasons.

In Figure 21 it will be seen that there is a pressure pump which delivers fluid at a pressure $P_1$ to two branches 4' and 5' which include the variable resistances $R'_w$ and $R'_v$ equivalent to the diagrammatically illustrated resistances of Figure 22 and comprising in the case of $R'_w$, a variable work resistance, and in the case of $R'_v$ a variable compensating hydraulic resistance.

These resistances are connected by channels 8' and 11' respectively to the complementally variable hydraulic resistances $R'_m$ and $R'_b$ corresponding to resistances $R_m$ and $R_b$ of Figure 22 which combine in a common return line 13' similar to the common return line 156, and having a pressure $P_4$. It will also be noted that channels 8' and 11' have operating branches 14' and 15' respectively which are responsive to the equal or unequal pressures $P_2$ and $P_3$ existing respectively in channels 8' and 11'.

That the work resistance is in effect an hydraulic resistance may be shown in the following way. In Figure 21, the opposition to free movement of the work piston connected by the rod 6' to the slide 7' is provided by the cutter C' acting against the work piece W'. For a given total opposition to movement, and a given equivalent piston area, there will be a given unit pressure difference across the piston. For a given equivalent quantity, or rate of flow $Q_w$, the equivalent resistance may be expressed in terms of reaction to unit flow as $$\frac{P_1=P_2}{Q_w}$$

which is the resistance $R_w$, and therefore directly comparable to the hydraulic resistance $R_w$ of Figure 22.

The system in Figure 21 is thus similar to that in Figure 22 and therefore the same equations must apply, that is, that $$\frac{R'_b}{R'_m}=\frac{R'_v}{R'_w}$$

whenever $P_2=P_3$.

Any movement of the valve spool relative to the ports 9' and 12' from its central position will effect a complementary change in the value of the resistances $R'_m$ and $R'_b$. If moved in a direction to make $R'_m>R'_b$ then there will be a fall in $P_3-P_4$ and a rise in $P_2-P_4$ which means that $P_2>P_3$ which inequality will be communicated to the operative branches 14 and 15 to effect a reproportioning of the initial resistances $R'_w$ and $R'_v$ to thereby re-equalize pressures $P_2$ and $P_3$. In the construction shown in Figure 21 this reproportioning or change is all effected in the resistance $R'_v$ while in Figure 22 the change is effected by complementally changing resistances $R_w$, $R_v$. The effect is the same because in either case we seek to make the ratio $$\frac{R_b}{R_m}=\frac{R_v}{R_w}$$

Therefore, if we make $R_m>R_b$, we decrease the value of the fraction or ratio $$\frac{R_b}{R_m}$$

A corresponding change may be brought about in the fraction $$\frac{R_v}{R_w}$$

in two ways: (1) by decreasing only the value of $R_v$, or (2) partially decreasing $R_v$ and partially increasing the value $R_w$. In either case the same result follows, i. e., the value of the ratio $$\frac{R_v}{R_w}$$

changed to equal $$\frac{R_b}{R_m}$$

and by the same means, that is a pair of operating branches responsive to pressure changes in the main channels operating on opposed piston elements, operatively connected to change the value of the ratio of the initial resistances in the respective flow paths, which change will continue until the ratios are equal because at that time the pressures $P_2$, $P_3$ are themselves equal.

From the foregoing it will be evident that with the construction shown in Fig. 2 (diagrammatically illustrated in Figure 22) by properly proportioning the values of the hydraulic resistances $R_b$, $R_m$, $R_v$ and $R_w$, and their rate of change of resistance with respect to movement of their controlling means, a highly sensitive remote control system is obtained, in which a secondary or relay member, such as the valve plunger 110, may be incrementally progressed by incremental movement of a sensitive primary member, such as the disc 135, without any mechanical connection between them.

The operation of the device as described thus far is as follows: referring to Figure 2, the shaft 26 will be rotated by the fire control unit which in turn will cause rotation of the rotor of the synchronous generator or transmitter 25 which by means of electrical phenomena will cause a similar angular movement of the receiver rotor 49. The shaft 153, which is connected for rotation with the rotor 49, will cause angular displacement of the disc 135 and thereby create a pressure differential between channels 138 and 139 which will be communicated to opposite ends of the plunger 110. This unbalancing of pressure will cause the plunger to move in the direction of the lower pressure and to continue moving until the pressure has been re-equalized, as previously described. Since the resistance spools 144 and 145 may be made of any length and thus provide any desired rate of change of resistance, it will be apparent that the length of plunger movement may be independent of the angular movement of the disc 135 which thus makes it possible to magnify a very slight movement of the disc 135 into a large movement of the plunger 110.

When the plunger 110 is moved to the left, fluid will flow in line 108 and line 107 will be connected to exhaust whereby the motor 102 will continue to rotate until the plunger 110 has been moved back to a central position. The rate of rotation will furthermore depend on the amount of displacement of the plungers. Rotation of the motor 102 will cause an angular displacement of the swash plate 63 and thereby initiate and continue to increase the displacement of the pump which will thus supply fluid to the connected motor unit and effect rotation of the shaft 71. As a matter of practical operation, the shaft 71 is connected to the shaft 101 through a shiftable clutch member 157 which is splined on the shaft 101 for movement by the manual control lever 158. Clutch teeth 159 on one face of the clutch are adapted to engage clutch teeth on end of shaft 71 for power rotation of the shaft 101. Clutch teeth 160 on the opposite face of the clutch are adapted to engage similar clutch teeth on the face of a large bevel gear 161 which is normally free to rotate, but intended for manual rotation of shaft 101 by means of bevel pinion 161' and hand wheel 158' in case of emergency.

It will thus be seen that a means has been provided whereby movement of a control shaft such as 26 at a remote station may be transmitted to the gun and impart movement to the gun adjusting mechanism.

Figure 18:
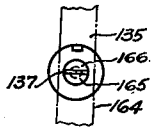
Figure 18 is a detail end view of one of the ports of the pressure differentiator as viewed on the line 18—18 of Figure 5.
Figure 6:
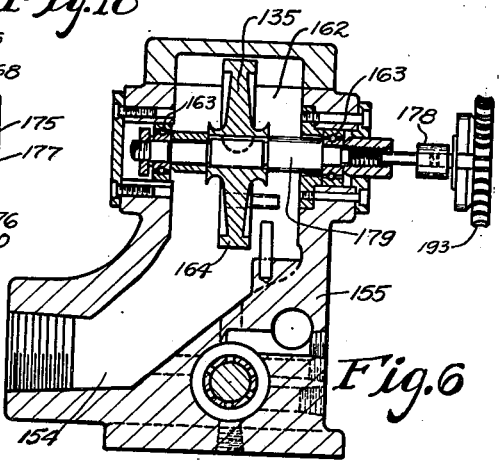
Figure 6 is a section on the line 6—6 of Figure 5.

The actual construction of one form of pressure differentiator is shown in Figures 5 and 6 and comprises the housing 155 having an upper rectangular shaped space 162 in which is rotated the disc 135. This disc is supported for rotation on anti-friction bearings 163 to insure easy movement thereof and prevent any frictional load on the rotor 49. The disc has a peripheral flange 164 which is of sufficient width as shown in Figure 18 to insure against the free lateral escape of fluid from the ports 136 and 137 and permit proper operation of the device. The ports are formed in shouldered members which are longitudinally divided as shown in Figures 5 and 18 to form two halves 165 and 166 which are milled at the end to form a long narrow slot which forms the ports 136 and 137. The two halves are assembled in a sleeve 167 and held tightly therein by the threaded plug member 168. An axial bore 169 is formed in the shouldered members and terminates in the elongated port at one end thereof. The sleeve 167 is slidably mounted in a bore 170 which is formed in the housing and has a radial port 171 which communicates at one end with the channel 139 and at the other end with a radial bore 172 in the shouldered member communicating with the axial bore 169. A set screw 173 engages a keyway 174 formed in the periphery of the sleeve to prevent the same from rotating. The sleeve 170 is axially adjusted toward and from the periphery of the disc by means of a screw 175 which is threaded in the plug member 168 and which passes freely through a hole 176 in a second adjustable member 177. This last member is adjusted to the desired position and then the screw 175 is tightened to draw the sleeve back into clamping engagement with the member 177. This makes it possible to adjust the distance between the periphery of the disc and the face of the port, which distance is approximately five-thousandths of an inch when the disc is in its normal position shown in Figure 2. The peripheral portions between the points 150 and 151', as well as between the points 149 and 152, are so profiled as to increase or decrease this spacing by approximately one-thousandth of an inch so that upon rotation of the disc the space will be increased at one port and decreased at the other to create the pressure differential.

Figure 8:
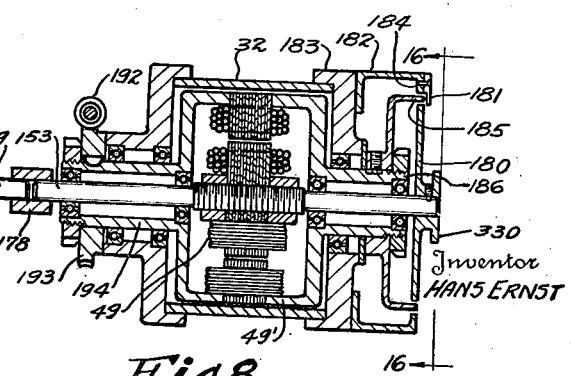
Figure 8 is a section through a self-synchronous motor unit having a rotatable field.

The rotor shaft 153 may be connected by a collar 178, Figures 6 and 8 to the disc supporting shaft 179. If the fixed pointer system of communication is used, the movable pointer 180 is also fixed to shaft 153 for rotation therewith as more particularly shown in Figures 8 and 16. The fixed pointer 181 is secured to an annular flange 182 projecting from the fixed casting 183 of the self-synchronous motor 32. The member 182 has a flanged portion 184 which is suitably graduated for cooperation with a second movable pointer 185 which is fixed to the sleeve 186 carrying the rotatable field of the motor. In this system of operation the pointer 185 really plays no important part but simply gives an indication to the operator of the actual angular position of the gun.

As previously explained in connection with this system, the pointers 180 and 181 must be maintained in alignment at the gunner's station in order to position the gun in accordance with the fire control unit. Therefore after the pointer has been moved upon rotation of the rotor 49 by the fire control unit, there must be some form of answer or feed back coming from the gun operating mechanism to tell that the gun has been moved the desired amount and to stop its further movement. This is effected in the following manner.

The shaft 101, which effects rotation of the pinion 82, has a spur gear 187 connected therewith and intermeshing with a spur gear 188 fixed to shaft 189, the latter being connected by bevel gearing 190 to a shaft 191 which has a worm 192 meshing with a worm wheel 193. The worm wheel 193, as shown in Figure 8, is connected to the sleeve 194 which carries the rotatable field coils such as 39, 40 and 41. Thus as the shaft 101 and pinion 82 are rotated, there is a feed back to the self-synchronous motor which continuously rotates the field in the opposite direction to that in which the rotor turned. The rotation of the field in space thus completely neutralizes the advance made by the rotor relative to its field; thus the rotor remains in a substantially fixed position in space as hereinafter described. Thus, if the pointer 180 has been advanced a fraction of a degree and the gun positioned the same amount, the movement of the gun will react to bring this pointer back into alignment with the fixed pointer 181. In order to understand the principle of operation, it must be kept in mind that the whole chain of events from the fire control unit through the motors, the hydraulic control system, the power unit and the feed back mechanism to worm 193 takes place by minute amounts and almost simultaneously. In other words, as soon as the shaft 26 is rotated the slightest amount, the armature 43 is moved to a new position in relation to its field coils which electrical reaction moves the rotor 49 to the same relative position with respect to its field coils and once this position is established, the electrical field in the motor is such as to maintain their relative positions so that when the returning answer rotates the worm 193 and thereby the field coil, the rotor 49 will be carried with it as a unit. It will be obvious that the connected shaft 153 and disc 135 will also be rotated a slight amount to set up through the hydraulic relay a rotation of pinion 82 for instance, and that almost simultaneous therewith the feed back or follow-up mechanism will rotate the field a slight amount in the opposite direction, turning the rotor 49 with it to recentralize the disc 135. Thus the disc 135 really need move no more than a fraction of a degree to one side or the other of its center position, and as fast as it is moved the slightest amount by the fire control unit the servo-mechanism will reposition it, or in other words return it to a neutral position. This constitutes the elements of a simple control system.

It will be noted from the previous description that the feed back mechanism to the worm 193 may be connected to the worm shaft 101 and not to the pinion rotating shaft 83 which means that the speed of the feed back mechanism would not be reduced by the reduction between the worm 100 and the worm wheel 99 but rather it was speeded up over the rate of rotation of the drive shaft 101. The actual ratio between the shaft 83 and the worm wheel 193 is usually such that the latter makes one revolution for every ten degrees of angular movement of the turret. This ratio is the controlling factor which determines the number of degrees of angular movement that will be imparted to the gun by each rotation of the rotor 49 relative to its field. Likewise, it determines the angular movement that will be imparted to the gun by one rotation of the shaft 26 since this shaft is connected mechanically and electrically to the rotor 49 in a one to one ratio. It will thus been seen that the ratio of the feed back mechanism determines in the final analysis the amount of angular movement that will be imparted to the gun for one rotation of the shaft 26. If the feed back mechanism is geared to a higher ratio so as to produce a higher speed of the worm gear 193, then the angular movement imparted to the gun by the shaft 26 will be reduced, while if the ratio is stepped down, the angular movement will be increased.

The situation often arises under actual operating conditions that a particular turret may have to be selectively controlled by different fire control stations so that if one station is swept away in the stress of battle, another may assume control. This change may be effected by a suitable switch which will disconnect the lines 29', 30' and 31' from the fire control transmitter 25 and connect them through lines 195, 196 and 197 to a new fire control unit. Since in the case described above, one revolution of the control shaft 26 and its rotor 43 only effects ten degrees of gun movement, it is apparent that any given position of the shaft 26 will correspond to a plurality of gun positions. Thus it might so happen that the corresponding control shaft and rotor at the new station may have the same operating position relative to its field, as the previous control shaft 26, but may actually be advanced or retracted therefrom by one or more complete revolutions, and therefore no reaction would be set up between the new transmitter rotor and the receiver rotor 49 to correct this situation. It is therefore necessary to provide additional means whereby this contingency cannot occur. It is proposed by this invention to provide a supplemental hydraulic control system which is connected in parallel with the system just described but which is operable for the full 360 degrees so that the transmitter and receiver rotors cannot get out of phase with the gun.

Since as previously described the controlling factor is the ratio of the feed-back mechanism, a second such mechanism is provided which has a one to one ratio with the gun rather than a 36 to 1 ratio as did the previous mechanism, so that the final driven member of this mechanism, such as the worm wheel 198, would be rotated only one revolution by each complete revolution of the gun. This worm wheel is connected to the rotatable field 199 of a self-synchronous motor or receiver 200. This motor has a rotor 201, one revolution of which relative to its field will correspond to one complete revolution of the gun, because the field 199 is only rotated one revolution for each 360 degrees of gun movement. The field 199 is connected by three transmission lines 202, 203 and 204 to the field 205 of a transmitter 206 located at the fire control station adjacent the high speed transmitter 25. The rotor 207 of the transmitter may be connected by the worm wheel 208 and the worm 209 to the control shaft 26 but in a reduction ratio of one to 36 whereby one revolution of the shaft 26 will only effect one thirty-sixth of a revolution of the transmitter rotor 207. It will thus be apparent that the shaft 26 must make 36 revolutions to rotate the transmitter rotor 207 through one revolution which in turn will cause one revolution of the rotor 201 relative to its field. Thus the gun must make one complete revolution in order to cause one revolution of the field 199 and thereby maintain the rotor 201 in a substantially fixed position in space.

The rotor 201 is connected by suitable means, such as the shaft 210, to a second pressure differentiator 211 similar to the one previously described, and which is connected by channels 212 and 213 to a control valve 214 containing a slidable valve plunger 215. This valve has a pressure port 216 which is connected to the pump delivery channel 112 and a pair of ports 217 and 218 which are connected respectively to the lines 107 and 108 leading to the control motor 102. A spool 219 on the plunger 215 determines the alternate connection of ports 217, 218 to the pressure port 216. The valve also has another pair of ports 220 and 221 which are connected by branch lines 222 and 223 to the reservoir return line 224. It will thus be seen that this valve plunger operates in the same way as the previously described control valve 109 for alternately connecting pressure to one of the lines of motor 102 and connecting the other line to reservoir. This valve is also provided with a pressure equilibrator comprising two resistance spools 225 and 226 which are adapted to move relative to the elongated pressure ports 227 and 228 which are connected by branch lines 229 and 230 to the main supply line 112. Each spool carries a reduced portion 231 and 232 which cooperate with these ports to form variable resistances similar to those in valve 109, and thus provide a means for creating a pressure drop in the fluid entering the valve, the fluid escaping freely through axial bores 233 and 234 near the end of the valve, thereby acting upon opposite ends of the plunger to shift the same back and forth when the respective pressures are unbalanced by the pressure differentiator.

The pressure differentiator disc 235 has a slightly different contour than the previously described disc 135 so that the valve 214 will normally not take control of the motor 102 except in the contingency previously mentioned. When it does take control, however, it is desirable that the previously described ten degree control mechanism be entirely disconnected, or in other words inoperative to prevent improper operation or loss of fluid pressure through that part of the system. For this reason the pressure supply line 112' to, as well as the return line 237 from, the valve 109, is led through the valve 214, so that these lines will be closed when the valve plunger 215 is shifted to a position to control the flow in lines 107 and 108. In other words the return lines 130 and 131 are connected by channel 237 to a port 238 in valve 214 and pressure line 112' or port 236 of said valve. Each of these ports communicates with narrow annular grooves 239 and 240 respectively formed in the valve plunger 215. A second pair of narrow annular grooves 241 and 242 are formed in the plunger 215 in spaced relation to the previous grooves but interconnected therewith through equally spaced flats or grooves 243 formed on the periphery of the intervening spools 244 and 245. Each groove 241 and 242 communicates respectively with ports 246 and 247, the port 247 being connected to the pressure line 112 and the port 246 being connected to the return line 224. When the plunger 215 is in a central position as shown in Figure 2 the pressure line 112 is connected to the pressure line 112' and the return line 237 from valve 109 is connected to the return line 224 thereby permitting the valve plunger 110 to operate in the manner previously described, while ports 217 and 218 are dead-ended so that no flow passes to or from through these ports, The pressure differentiator disc 235 has a portion of its circumference extending counterclockwise from the point 248 to the point 249 of a radius equal to the distance from the center 250 of the disc 235 to the faces of the ports 136' and 137' minus a very small clearance distance, and the included angle of this arc is greater than 180 degrees and may be equal to 185 degrees to permit a two and one-half degree overlap at each port. Since the disc 135 does not normally oscillate more than a fraction of a degree from its central position, with respect to its associated ports, it will be apparent that during normal operation of the disc 135 no change in pressure will occur at the ports of disc 235. The remaining portion of the periphery of the disc 235 extending clockwise from the point 248 to the point 249 is concentric with the center, but of a radius which is less by about 1/32 of an inch, so that when the disc is rotated a sufficient distance a very sudden decrease in resistance at one of the ports 136' or 137' and thus a sudden drop in pressure will occur in one of the channels 212, 213 and thereby insure a sudden shifting of the valve plunger 215. The formation of the reduced portions 231 and 232 of spools 225 and 226 is such that they effect a small rate of change of hydraulic resistance per unit of length of movement of plunger 215 and thereby act slowly relative to valve plunger movement in re-equalizing the pressure in channels 212 and 213. In fact they are so formed that the plunger will hit the end of the valve housing before re-equalization of pressures in channels 212 and 213 occurs, thereby insuring that the plunger will move the full length of its possible movement in its housing and thus provide immediate full opening or closing of the various controlled ports.

As previously mentioned this only occurs when a new control station which is considerably out of phase with the gun is connected thereto, so that a large movement must take place before the parts are brought into proper phase with one another. This sudden shifting of the valve plunger 214 either to the right or to the left will cut off the pressure line 112' and the return lines 130 and 131 of control valve 110 and immediately connect either line 107 or line 108 to pressure through valve 214 so that the motor 102 will be actuated to cause high speed operation of the gun adjusting motive power unit. While the gun is being properly coordinated, the feed back mechanism is operating on the worm wheel 198 and thereby, through the shaft 210, to reposition the disc 235 again in its normal position shown in Figure 2. However, due to the fact that the included angle of the peripheral portion having the larger radius is greater than 180 degrees, it will be obvious that the valve 214 will relinquish control before the disc 235 has completely returned whereby the other valve 109 will again assume control to effect the final accurate positioning of the gun.

If the control shaft 26 happens to be displaced a fraction of a revolution greater than one-half (or any number of revolutions plus said fraction) from the corresponding shaft of the new control station when the latter is connected for operation of the gun, the receiver rotor 49 will attempt to assume its new correct position relative to its field to synchronize with the position of the new transmitter rotor relative to its field by turning through the shortest possible angle which obviously will be in the wrong direction. If permitted to do this, however, disc 135 would also be turned in the wrong direction, that is, in the opposite direction to which it should have been turned in order to synchronize the gun with the new control station resulting in the gun itself and also the rotary field 49' being moved in the wrong direction which movement will continue until a position is reached which corresponds to an incorrect displacement of the control shaft 26 equal to the nearest whole number of revolutions greater than the previous fractional displacement. It will thus be seen that in such a case all of the elements of the control system from shaft 26 to and including the valve 109 will be in synchronism with one another but that the gun itself will still be out of phase with the new control station by an angular displacement corresponding to one or more complete revolutions of the transmitter control shaft.

As previously described, however, there is provided a supplemental hydraulic control system including the disc 235 which will assume control whenever the displacement between the new transmitter control shaft and the gun is greater than the overlap of said disc with respect to its ports. This overlap must be made sufficiently small so that the disc 235 and associated control valve 214 will assume control of positioning of the gun whenever the displacement of the control shaft 26 is more than one-half of a revolution with respect to the corresponding control shaft of the new station, but in order to provide a proper margin of safety, the overlap is actually made substantially less than this.

It will now be apparent that when a new control station is coupled in which is out of phase with the gun in the manner explained that the two discs 135 and 235 will immediately be moved through large angles whereas small angles of movement will be sufficient to cause movement of the gun at its highest rate. Therefore in order to prevent too much unnecessary or undesirable movement of the discs, stops 306, 307 and 309, 310 have been provided on discs 235 and 135 respectively which engage opposite sides of fixed pins 308 and 311 to limit the movement.

Attention is invited to the fact that the holes in the bottom of grooves 227, 228, 142 and 143 are all shaped, as shown in Figure 19A, as parallel sided slots 227' with semi-circular ends so that the hydraulic resistance will vary uniformly upon longitudinal movement of the valve plungers.

It will be recalled in connection with Figure 24, that the arcuate shaped passages 73' were alternately subjectible to pressure depending upon the manner of operation of the pump 59. Since the pressure in these passages might become unduly excessive due to sudden movement of the gun at a rapid rate under the abnormal condition previously described, means have been provided for relieving this excessive pressure. A pair of channels 312 and 313 are connected to the respective passages as shown in Figure 2 and each has a check valve 314 therein, as shown in Figure 2, set to cause a predetermined pressure drop. These two channels merge into a common channel 315 which is connected to one end of a valve housing 316 so that the pressure fluid will act on one end of the contained plunger 317. An hydraulic resistance coil 318 is connected in series between the end of the valve housing and reservoir 114 to cause a further pressure drop and thereby maintain a suitable operating pressure on the plunger 317. In fact, the value of resistances 314 and 318 may be the same whereby half of the pressure drop may occur at each.

The valve housing 316 has a pair of longitudinally spaced ports 319 and 320 to which the line 108 is connected. Upon movement of the plunger 317 against the resistance of spring 321 by excessive pressure in channel 315, the spool 322 on plunger 317 will close ports 319 and 320 and stop operation of motor 102.

A modified form of pressure differentiator is shown in Figures 20 and 23, in which the ports 136 and 137 discharge against opposite faces 323 and 324 of the disc 325, an expanded sectional view of which is shown in Figure 23. The dash and dot lines 326 and 327 are 180 degrees apart and the axis of the ports may lie on either one of these lines and thereby normally in the center of the profiled portions 328 and 329 whereby movement of the disc either right or left as viewed in Figure 23 will complementally change the pressure drops at these ports in a manner similar to that described in connection with the profiled portions of disc 135.

In Figures 13 and 14 there is shown a modified form of connecting the feed back mechanism to the pressure differentiator. In the prior construction, as described in connection with Figures 2 and 8, the feed back worm 192 acted through the worm wheel 193 to rotate the field in order to maintain the disc 135 in substantially the same position relative to the opposed ports. This was possible because the electrical field created in the self-synchronous device was such as to cause the rotor to move simultaneously with the field, the two moving as a unit and therefore rotating the shaft 153 connected to disc 135. It will be seen that the main purpose of this feed back mechanism is to always maintain the disc 135 in substantially the same position at all times with respect to its ports, its total rotary movement normally never exceeding more than a fraction of a degree. In the modified form, shown in Figures 13 and 14, the field 251 is stationary which means that the rotor 252 may be moved continuously in one direction and likewise the connected differentiator disc 253.

It is desirable, however, to maintain the opposed ports always opposite to the profiled portions 149, 152 and 150, 151' and this may still be accomplished by mounting the ports in a rotatable member 254 and connecting the feed back worm 192 and worm wheel 193 to a reduced portion 255 of this member. In such a case, of course, the channels, such as 138 and 139, shown in Figure 2 must be so connected as to maintain flow through the ports regardless of the angular position of the member 254. To this end the two lines are connected respectively to spaced annular grooves 256 and 257 formed in the hub 255 and connected through interdrilling to a pair of channels 258 and 259, which are connected as before to ports 172. The various connections are diagrammatically illustrated in Figure 14 in which it will be noted that the receiver stator winding is not provided with brushes and collector rings as in the construction shown in Figure 2.

In accordance with the standards of naval authorities of maintaining gun batteries in commission as long as possible, and in spite of various contingencies, there has been provided various alternate controls for utilizing as much of the present equipment that might remain in commission as far as possible. For instance, the communication system from the fire control station to the turret may be intact, but the hydraulic relay system from the receiver to the motive power unit may become incapacitated for some reason. Means have been provided, as shown in Figure 2, for utilizing the motive power unit by controlling the same by hand. To this end the shaft 75 which controls the position of the swash plate is provided with a pinion 260 which is mounted for free rotation on the shaft but may be operatively coupled thereto by a clutch member 261. This clutch member has clutch teeth 262 on one face engageable with similar clutch teeth 263 on the end of the drive shaft of motor 102 and a single clutch tooth socket 264 engageable by clutch tooth 265 carried by the pinion. The member 261 is shiftable by a shifter fork 266 pivotally mounted at 267 for operation by the hand lever 268.

It is thus apparent that if the hydraulic control system from the receiver rotor to the motor 102 should become incapacitated, the member 102 may be disconnected from the swash plate and this plate may be connected to the pinion 260. This pinion meshes with a rack 269 fixed to the end of a longitudinally shiftable rod 270 which is pivotally connected at 271 to one end of a lever 272. This lever is pivoted at a middle point 273 to a fixed part of the turret and has a bifurcated arm 274 engaging a flange 275 formed on the end of shaft 276. This shaft has a threaded portion 277 meshing with a rotatable nut 278 which has a bevel gear 279 surrounding the same and meshing with a bevel gear 280. The bevel gear 280 is secured to one end of a shaft 281 which extends to the gunner's position adjacent the gun where it is interconnected through bevel gearing 282 to a manually operable shaft 283. A pair of manual control levers 284 are secured to opposite ends of this shaft, but in 180 degree phase relation to one another for operation by the gunner.

The shaft 276 has a flanged end 285 which has a toothed periphery engaging similar formed internal teeth 286 carried by the tubular member 287. This member has clutch teeth 288 on the one end engageable with clutch teeth 289 on the clutch member 290 which is splined on the end of shaft 101. The clutch 290 is shifted by the fork 291 which is pivotally mounted at 292 in a fixed part of the turret and operatively connected by a link 293 to the manually operated lever 268.

When it is desired to use the manual control levers 284, the lever 268 is thrown to the left of the position shown in Figure 2, thereby engaging clutch 261 with pinion 260 and clutch 290 with the tubular member 287. Upon rotation of the shaft 283 by levers 284 the nut member 278 will be rotated, but since it is held against longitudinal movement by the abutments 294, the shaft 276 will be moved longitudinally instead. As the shaft 276 moves it operates through the link 270 and rack 269 to rotate pinion 260 and thereby angularly position the swash plate of the power unit which in turn will cause rotation of shaft 101 to angularly position the gun. Rotation of the shaft 101 will, however, through the clutch 290 and the tubular member 287 effect rotation of the shaft 276 in the opposite direction through the member 285. This will cause the shaft 276 to move in the opposite direction from the previous movement imparted by the hand levers and reposition the swash plate to stop power actuation of the gun adjusting mechanism. Since the communication system from the fire control station is assumed to be still in operation the feed back mechanism from shaft 101 will still react on the pointers so that the gunner may still utilize the communication system for determining the position of his guns.

On the other hand, the communication system may be rendered inoperative, in which case the rotor may be turned by hand through control knob 330 secured to the end of shaft 153. On this case the pointer 180 would move relative to graduated dial 184 through the desired angle and the pointer 185 would be caused to follow up by the feed back mechanism.

Should the motor unit become incapacitated the gun may still be positioned from the bevel gear 161, at which time the motor unit will be disconnected by the clutch member 159 in the manner previously explained.

A modified form of this manual operation is shown in Figure 9, in which the motor 102 instead of being connected to the shaft 75 is connected to the bevel gearing 282 by means of a bevel gear 295 so that the swash plate is controlled entirely from the rack 269 and pinion 260. In this case the shaft 281 will be moved by the motor, but if the hydraulic system becomes inoperable the device may be controlled manually by the gunner without the necessity of making any changes. However, if the motor 102 and the fluid therein does form a drag or resistance to manual operation the fluid therein may be released to reservoir by providing a suitable reversing valve 296 having spools for closing off the incoming lines 107 and 108 and connecting the ports of motor 102 to the return line 297. This valve may be shifted by the manually operable lever 298 which may be suitably connected to the plunger 299 of the reversing valve.

Instead of providing a reversing valve the simple clutch 300 may be provided as shown in Figure 10 between the motor 102 and the gear 295, the clutch normally having a position to maintain power operation, but upon downward movement of the control lever 301 the clutch may be disconnected to permit manual operation of the levers 284 without resistance from the motor 102.

There has thus been provided a sensitive control mechanism which may be connected on the one hand to a sensitive communication system and on the other hand to a gun adjusting motive power unit for automatically relaying signals from a remote control station to the power unit without human intervention, together with a suitable feed back mechanism for limiting and stopping the movement. This mechanism makes it possible for the fire control station of a naval vessel to directly and immediately control the position, both azimuth and elevation, of all guns on the ship in an easy and expeditious manner.

What is claimed is:

1. In a gun control mechanism the combination of a power unit including a pump and motor, a prime mover for continuously actuating said pump, means coupling the motor to said gun, an oscillatable member for controlling the displacement of said pump, said member having a zero displacement position, a communication system including a transmitter and receiver, means coupling the receiver to said pump displacement control member including a fluid rotatable device for moving said member out of said last named position upon signal reception from the transmitter to effect actuation of the motor, and means controlled by the gun for effecting reverse rotation of said device to move said member into its first named position on completion by the gun of movement as determined by the transmitter.

2. In a gun control mechanism the combination of a communication system for transmitting the angular extent of gun movement from a remote fire control station to the gun including electrically interconnected self-synchronous devices, one of which constitutes a transmitter at said station, and the other a receiver, said receiver having a rotor angularly movable in response to signals from the transmitter, a power operable unit connected for gun movement having a control member movable to different positions to start and stop the gun, interponent hydraulic control means for transmitting motion from the receiver to the control member, means operable upon subsequent movement of the gun to move said control member to a stop position, said hydraulic control means including a fluid rotatable motor having a pair of channels connected thereto whereby pressure in either channel, while the other channel is connected to exhaust, will cause reverse rotation of the motor and equal pressure on both channels will stop the motor, and means operable by the receiver for determining pressural flow in said channels.

3. In a gun control mechanism the combination of a transmitter and a receiver, a power operable unit connected to the gun for movement thereof, means controlling the starting and stopping of said unit including a rotary hydraulic motor having a pair of control channels alternately subjectible to pressure to cause reverse operation of said unit, means coupling the motor for control by the receiver including valve means movable to a plurality of positions for determining the channels to be connected to pressure, and means responsive to movement of the gun to position said valve means in a stop position.

4. In a gun control mechanism the combination with a communication system including a transmitter and receiver, of a power operable unit connected to the gun for movement thereof, a rotatable hydraulic motor having a pair of control channels alternately subjectible to pressure for determining reverse operation of said unit, means coupling the channels to said receiver for control thereby including valve means having a neutral position and operative positions on either side thereof, means operable by the receiver upon signal reception from the transmitter to move said valve means to one of its operative positions, and feed back means operative by the gun to move said valve means to its neutral position.

5. In a gun control mechanism the combination with a communication system having a transmitter and a receiver, the receiver including a rotor positionable by the transmitter, a power unit connected to the gun for operation thereof, a fluid operable device for controlling actuation of said unit, a pair of channels connected to said device, a source of fluid pressure, a control valve shiftable to different positions for alternately connecting said channels to said source of pressure to determine reverse operation of the power unit, and hydraulic relay means responsive to movement of the receiver rotor for shifting said valve to its various positions.

6. In a gun control mechanism the combination with a communication system having a transmitter and a receiver, the receiver including a rotor positionable by the transmitter, a power unit connected to the gun for operation thereof, a device for controlling actuation of said unit including a fluid rotatable motor, a pair of channels connected to said motor, a source of fluid pressure, a control valve shiftable to different positions alternately subjecting said channels to pressure to determine reverse rotation of the motor, relay means responsive to movement of the receiver rotor for shifting said valve to its various positions, and feed back means responsive to gun movement and effective on said motor to move said device to a stop position.

7. In a gun control mechanism the combination with a communication system having a transmitter and a receiver, the receiver including a rotor positionable by the transmitter, a power unit connected to the gun for operation thereof, a fluid rotatable device for controlling actuation of said unit, a pair of channels connected to said device, a source of fluid pressure, a control valve shiftable to a multiplicity of positions for alternately subjecting said channels to pressure to determine reverse operation of said device and thereby of said power unit, relay means responsive to movement of the receiver rotor for shifting said valve to its various positions, said relay means including pistons at opposite ends of the valve, and a pressure differentiator operable by the rotor for unbalancing the pressure on said pistons to cause shifting of the valve.

8. In a gun control mechanism the combination with a communication system having a transmitter and a receiver, the receiver including a rotor positionable by the transmitter, a power unit connected to the gun for operation thereof, a fluid operable device for controlling actuation of said unit, a pair of channels connected to said device, a source of fluid pressure, a control valve shiftable to different positions for alternately subjecting said channels to pressure to determine reverse operation of the power unit, relay means responsive to movement of the receiver rotor for shifting said valve to its various positions, said relay means including pistons at opposite ends of the valve, a pressure differentiator operable by the rotor for unbalancing the pressure on said pistons to cause shifting of the valve, and a pressure equilibrator operable by the valve for re-equalizing the pressure to stop movement of the valve.

9. In a gun control mechanism the combination with a communication system consisting of a transmitter and receiver, of a power operable device connected with the gun for actuation thereof, a power operable control device for starting and stopping said power unit including a pair of channels alternately subjectible to pressure for reverse operation of the power means, a control valve including a shiftable plunger for determining the coupling of pressure to said channels, means coupled to the receiver for shifting said plunger, said plunger having piston portions on opposite ends thereof whereby, when the total pressure on said pistons is unequal, the valve plunger will move, and when the total pressure is equal the plunger will stop, a pressure differentiator movable by the receiver for unbalancing said pressure, and an automatic pressure equilibrator for equalizing pressure on said pistons to limit the length of plunger movement.

10. In a gun control mechanism the combination of a power unit coupled to the gun for effecting angular movement thereof, a control member for said unit for determining movement thereof, fluid operable means for shifting said member, a communication system including a receiver unit comprising an integrally movable rotor and pressure differentiator, means coupling said differentiator to the fluid operable means whereby signals received by said unit will be translated into movement of said control member, and a pointer associated with said rotor for indicating the extent of angular movement effected.

11. A gun control mechanism comprising a power unit for translating the gun, a communication system terminating in a rotor, a pilot control circuit for determining the rate and direction of operation of said power unit including a shiftable control valve plunger, means coupled to the rotor for determining the position of said plunger including a pressure differentiator, pistons for shifting said valve means, channels extending from said pistons and terminating in a pair of opposed ports, a disc coupled to the rotor and interposed between said ports, diametrically opposed profiled portions on the periphery of said disc for simultaneously increasing the resistance of one of said ports and decreasing the resistance of the other whereby small angular movements of the rotor and disc will be magnified into large movements of said valve plunger.

12. In a gun control mechanism the combination of a power unit coupled to a gun for oscillation thereof, a communication system terminating in a receiver having a rotor movable in response to signals from a transmitter, interponent power means coupling the rotor for control of the rate and direction of said power unit including a valve plunger having a central inoperative position, and operative positions on opposite sides thereof, a pair of pistons for shifting said plunger, fluid channels extending from said pistons and terminating in opposed ports, a disc rotatably mounted between said ports, said disc having a first position in which the resistance to flow from said ports is equal, portions on the periphery of said disc adaptable upon movement thereof away from its first position to increase the resistance of one port and decrease the resistance of the other, said rotor tending to cause movement of the disc away from its first position to cause actuation of the power unit, and means operable by the gun continuously acting to return the disc to its first position and thereby automatically stop the movement of the gun.

13. In a gun training and control mechanism the combination of a large power unit coupled to the gun for actuation thereof, a communication system whereby the range of the gun may be transmitted over long distances, said system terminating in a highly sensitive rotor capable of developing a very small power output and a hydraulic amplification system including a valve member integrally connected to the rotor for coupling the rotor to said power unit whereby the small input from said rotor may be amplified to a large output in said power unit.

14. In a gun control mechanism the combination of a communication system including a transmitter and a receiver, a power operable unit for angularly positioning the gun, a pair of relatively separable dials associated with the receiver, one of which is movable relative to the other in response to signals by the transmitter for indicating the extent of gun movement to be effected, means coupling the receiver to the power unit for automatic operation thereof, manually operable means directly connectible with the gun for alternatively translating the same, feed back means operable by the gun for repositioning said dials to indicate that the desired movement has been effected, and selector clutches for coupling either the power unit or said manual means for control of the gun.

15. In a gun control mechanism the combination with a communicating system having a transmitter and a receiver, said receiver having a pair of dials associated therewith, one of which is movable relative to the other upon signal reception from the transmitter to indicate the extent of gun movement desired, a motive power unit for training the gun, automatic means coupled to the receiver for controlling operation of said power unit, manually operable means for controlling operation of said power unit, a third means including a manually operable device for training said gun independent of the power unit, a feed back system operable by the gun for repositioning the dials to indicate that the desired extent of gun movement has been completed and selector clutch means for coupling any one of said three named means for control of the gun.

16. In a gun control mechanism having a power operable unit for effecting translation of the gun, and a signaling system for transmitting gun ranges from a remote control point including a transmitter and a receiver, the combination of fluid operable means for controlling the rate and direction of said power unit by the receiver including a pair of pressural control channels, valve mechanism operable when a major difference exists between the position of the transmitter and the receiver to effect a sudden pressure differential in said channels and thereby a rapid adjustment of the gun, and additional valve mechanism automatically operable when a minor difference exists between the transmitter and receiver variably to control the pressure in said channels in accordance with the relative displacement in position between the transmitter and receiver.

17. In a gun control mechanism having a power operable unit for effecting translation of the gun, and a signaling system for transmitting gun ranges from a remote control point including a transmitter and a receiver, the combination of fluid operable means for controlling the rate and direction of said power unit by the receiver including a pair of pressural control channels, valve mechanism operable when a major difference exists between the position of the transmitter and the receiver to effect a sudden pressure differential in said channels and thereby a rapid adjustment of the gun, additional valve mechanism automatically operable when a minor difference exists between the transmitter and receiver variably to control the pressure in said channels in accordance with the relative displacement in position between the transmitter and receiver, a hydraulic couple between said valve mechanisms, said first valve mechanism including a plunger, and means on said plunger reacting on said hydraulic couple to render said second valve mechanism inoperative during assumption of control by the first plunger.

18. In a gun control mechanism having a power operable unit connected to the gun for actuation thereof and a communication system including transmitter and receiver rotors, means for coupling the receiver rotor to said power operable unit for controlling the rate and direction of movement thereof including a fluid pilot control circuit, a pair of control discs operable by the receiver, valve means associated with the first disc for effecting large movements of the gun, a second valve means associated with the second disc for effecting minute movements of the gun, and means for rendering the first disc inoperative during assumption of control by the second disc.

19. In a gun control mechanism the combination with a power operable unit connected with a gun for effecting adjustment thereof, and a communication system including a transmitter rotor and a receiver rotor, the latter being movable in accordance with the movement of the first, of means coupling the receiver to said power operable unit for determining the rate and direction of movement thereof including a fluid operable member, dual control valves coupled in parallel to said member, a source of fluid pressure, hydraulic amplification means between the receiver and each control valve, one of said receivers being unresponsive to small movements of the receiver rotor whereby the other means will assume control of said unit, and means responsive to a large variation in the position of said transmitter and receiver rotors to cause said first named valve means to assume control and render the second valve means inoperative.

20. In a gun control mechanism the combination of a power unit coupled to the gun for effecting translation thereof, and a communication system including transmitter and receiver rotors angularly positionable to indicate the angular position of the gun, fluid operable control means for determining the rate and direction of movement of said power unit, a high speed feed back mechanism coupled to the gun whereby one rotation of one receiver rotor will effect only a fraction of a revolution of the gun mechanism, and a low speed feed back mechanism coupled to the gun whereby one rotation of the other receiver rotor will effect one rotation of the gun mechanism for approximate positioning of the gun.

21. In a gun control mechanism the combination of a communication system including a transmitter and a receiver, a power unit for translating the gun, fluid operable control means between the receiver and said unit for automatically positioning the gun in response to signal reception by the receiver, relatively separable pointers associated with the receiver for indicating the amount of movement imparted to the gun, manually operable control means for effecting operation of said power unit, feed back means operable by the gun to re-align said pointers to indicate that the desired movement of the gun has been completed regardless of whether the movement has been effected automatically or manually, said feed back mechanism also acting to automatically stop the gun movement upon re-alignment of said pointers when automatically controlled, an additional feed back mechanism for terminating movement of the gun when the same is manually controlled, and a manually operable control valve for rendering the first system ineffective during operation of said manual control means.

22. A gun control mechanism comprising a power unit for translating the gun, a communication system terminating in a rotor, a pilot control circuit for determining the rate and direction of operation of said power unit including a shiftable control valve plunger, means coupled to the rotor for determining the position of said plunger including a pressure differentiator, pistons for shifting said valve means, channels extending from said pistons and terminating in a pair of opposed ports, a disc coupled to the rotor and interposed between said ports, profiled portions on said disc for simultaneously increasing the resistance of one of said ports and decreasing the resistance of the other whereby small angular movements of the rotor and disc will be magnified into large movements of said valve plunger.

23. In a gun control mechanism the combination of a power unit coupled to a gun for oscillation thereof, a communication system terminating in a receiver having a rotor movable in response to signals from a transmitter, interponent power means coupling the rotor for control of the rate and direction of said power unit including a valve plunger having a central inoperative position, and operative positions on opposite sides thereof, a pair of pistons for shifting said plunger, fluid channels extending from said pistons and terminating in a pair of ports, a disc rotatably mounted for movement past said ports, said disc having a first position in which the resistance to flow from said ports is equal, profiled surfaces on said disc adaptable upon movement thereof away from its first position to increase the resistance of one port and decrease the resistance of the other, said rotor tending to cause movement of the disc away from its first position to cause actuation of the power unit, and means operable by the gun continuously acting to return the disc to its first position and thereby automatically stop the movement of the gun.

24. In a gun control mechanism, the combination with a synchronously inter-connected transmitter and receiver, of a variable speed power unit for effecting movement of the gun, a rotary hydraulic motor connected to the unit and adjustable to determine the direction and rate of operation of said unit, interponent hydraulic means for translating movement of the receiver into fluid actuation of the motor, and means responsive to movement of the gun and effective on said interponent hydraulic means to stop said power unit.

25. In a gun control mechanism, the combination of a transmitter and a receiver, a variable speed power operable unit connected for moving the gun, said unit having an oscillatable rate control member movable in opposite directions from a stop position to accelerate said unit, a rotatable fluid operable motor for power moving said rate control having a pair of control channels selectively subjectable to pressure to cause reverse operation of the motor, valve means coupling the channels for control by the receiver whereby movement of the receiver will shift said valve means to cause acceleration of the power unit, and means responsive to movement of the gun for repositioning the valve means to reverse the pressure connections to said channels and thereby stop the power unit.

26. In a gun control mechanism the combination with a synchronously interconnected transmitter and receiver, of a power operable unit connected to the gun, said unit having an oscillatable rate and direction control member, a rotatable fluid operable motor for oscillating said member, a pair of control channels selectively subjectable to pressure for delivering fluid to said motor, means coupling the channels to the receiver for control thereby including valve means having a neutral position, and operative positions on either side thereof, means responsive to movement of the receiver for shifting said valve means to one of its operative positions, and feed back means operative by the gun to move said valve means to its neutral position.

27. In a gun control mechanism the combination with a synchronously interconnected transmitter and receiver, said receiver including a sensitive rotor positionable by the transmitter, of a variable speed power unit connected for operation of the gun, said unit having an oscillatable rate control member, said member also having a stop position, a rotary fluid operable motor for shifting said member to and from its stop position for accelerating and decelerating said unit, a pair of fluid delivery channels connected to said motor, a source of fluid pressure, a control valve shiftable from a neutral position for selectively determining the channel to be subjected to pressure and the rate of flow therethrough and thereby forward or reverse operation of the power unit, and hydraulic relay means responsive to movement of the receiver rotor without detracting from its sensitivity for shifting said valve to its various positions.

28. In a gun control mechanism the combination with a communication system having a transmitter and a receiver interconnected for synchronous movement, the receiver including a rotor, of a variable speed power unit connected to the gun for operation thereof, a rotary fluid operable motor for controlling the rate of operation of said unit, a pair of fluid channels connected to the motor, a source of fluid pressure, a control valve shiftable to different positions for selectively connecting said channels to pressure to determine reverse operation of the power unit, hydraulic relay means responsive to movement of the receiver rotor for shifting said valve to its various positions, and feed back means responsive to gun movement and effective first to reverse the fluid connections to said motor and thereby deceleration of the power unit, and secondly to position said valve means to stop operation of said power unit.

29. In a gun control mechanism the combination with a synchronously interconnected transmitter and receiver, said receiver comprising a sensitive rotor, a variable speed hydraulic power unit connected for operation of the gun, said unit including an oscillatable rate and control member having a stop position, a rotary fluid operable motor for oscillating said member from its stop position to cause actuation of said unit, a pair of fluid delivery channels connected to said motor, a source of fluid pressure, a control valve having a first position for disconnecting said channels from said source, and other positions for selectively connecting said channels to said source to determine reverse operation of the motor, hydraulic relay means responsive to movement of the receiver rotor without detracting from its sensitivity to shift said valve from its stop position to cause operation of the power unit in a given direction, and means responsive to movement of the gun and effective upon stoppage of the receiver to shift said valve means to a position reversing the pressure connections to said channels and thereby reverse operation of the motor to stop the power unit and thereby the gun.

30. A gun control mechanism comprising a power unit for translating the gun, a communication system terminating in a receiver rotor, a pilot control circuit for determining the rate and direction of operation of said unit including a shiftable control valve plunger, means operatively coupled to the rotor for determining the position of said plunger including a pressure differentiator, pistons for shifting said valve means, channels extending from said pistons and terminating in a pair of spaced ports, a rotatable member coupled to the rotor for relative movement with respect to said ports, profiled portions carried by said member, and effective upon rotation thereof for simultaneously increasing the resistance to flow from one of said ports and decreasing the resistance to flow from the other whereby small angular movements of the rotor and member will be magnified into larger movements of said valve plunger.

31. In a gun control mechanism having a variable speed power operable unit for training a gun, and a signaling system for remotely controlling the position of the gun, said system including two pairs of synchronously interconnected transmitters and receivers, the combination of a rotary hydraulic motor, a relatively movable screw and nut member, one of which is operatively connected for controlling the rate of operation of said unit, means coupling the other member to said motor for effecting relative movement therebetween, a first control valve coupled to one of said receivers for determining operation of said motor at relatively high speeds, a second control valve connected to the other receiver for determining operation of said motor at low speeds, means rendering the second valve ineffective when the first valve was in an operative position, and feed back mechanism from the output of said power unit for effecting relative rotation between said screw and nut member to effect deceleration of the power unit without actuating said control motor.

32. In a gun control mechanism, the combination of a power unit including a pump and motor, a prime mover for continuously actuating said pump, means coupling the motor to said gun, an oscillatable member for controlling the displacement of said pump and having a zero displacement position, a communication system including a transmitter and a receiver, an hydraulic amplification means for transmitting motion from the receiver to said pump displacement control member including a portion movable in one direction for moving said control member out of said last-named position upon signal reception from the transmitter to effect actuation of the motor, and means controlled by the gun and effective on said portion for moving said control member into its first-named position on completion of gun movement as determined by the transmitter.

33. In a gun control mechanism having a power operable unit connected for actuation of a gun and a communication system including a remote transmitter and an adjacent receiver, means for coupling the receiver to said power operable unit for controlling the rate and direction of movement thereof, including a fluid pilot control circuit, a pair of control elements for the pilot circuit operable by the receiver, valve means associated with one element through said circuit, for effecting large movements of the gun, a second valve means associated with the other element through said circuit for variably regulating minute movements of the gun, and means for rendering the fluid pilot circuit control by the second-named element inoperative during assumption of control by the first-named element.

34. In a gun control mechanism, the combination of a transmitter and a receiver, said receiver including a sensitive rotor responsive to minute power impulses, a power operable unit connected for movement of the gun, and including a control requiring a much greater torque than that of the rotor for actuating the same, and an hydraulic amplification system directly controlled by and effectively varied in proportion to movement of the rotor for adjustment of said control proportionately as respects shifting of the rotor.

35. In a gun control mechanism, the combination of transmitting and receiving means, said receiving means including a pair of sensitive rotors, one of which is movable angularly in accordance with the desired angular adjustment of the gun and the other at a multiplied ratio thereto, a reversible variable speed power unit for actuating the gun, a control member for varying the rate and direction of said unit, means responsive to positional changes of the last-named rotor but not to the torque thereof for actuating said control to cause movement of the gun in step with the director, and means responsive to the first-named rotor when the gun is out of phase with the director to assume control of said power unit and cause movement of the gun back into substantial phased relation with the director.

36. In a gun control mechanism, the combination of a power unit adapted to be coupled to the gun for effecting translation thereof, and a communication system including transmitter and receiver rotors angularly positionable to determine the angular position of the gun, fluid operable control means for determining the rate and direction of movement of said power unit, a high speed feed back mechanism associated with the gun whereby one rotation of one receiver rotor will effect only a fraction of a revolution of the gun, and a low speed feed back mechanism associated with the gun whereby one rotation of the other receiver rotor will effect one rotation of the gun for approximate positioning of the gun.

37. In a gun control mechanism including a director, the combination of transmitting and receiving means, said receiving means including a pair of highly sensitive rotors, one of which is movable in positional agreement with the transmitter and the other at a proportional ratio thereto, a reversible variable speed power unit for actuating the gun, a control member for varying the rate and direction of said unit, means responsive to positional changes of one of said rotors for actuating said control to cause movement of the gun in step with the director, and means responsive to the other of said rotors when the gun is out of phase with the director to assume control of said power unit and cause movement of the gun back into substantially phased relation with the director.

38. In a gun control mechanism including a director, the combination of transmitting and receiving means, said receiving means including a pair of highly sensitive rotors, one of which is movable in positional agreement with the transmitter and the other at a proportional ratio thereto, a reversible variable speed power unit for actuating the gun, a control member for varying the rate and direction of said unit, means responsive to positional changes of one of said rotors for actuating said control to cause movement of the gun in step with the director, means responsive to the other of said rotors when the gun is out of phase with the director to assume control of said power unit and cause movement of the gun back into substantially phased relation with the director, and automatic means for selectively rendering one or the other of said rotors effective as respects gun movement control.

39. In a gun control mechanism including a director, the combination of transmitting and receiving means, said receiving means including a pair of highly sensitive rotors, one of which is movable in positional agreement with the transmitter and the other at a proportional ratio thereto, a reversible variable speed power unit for actuating the gun, a control member for varying the rate and direction of said unit, means responsive to positional changes of one of said rotors for actuating said control to cause movement of the gun in step with the director, means responsive to the other of said rotors when the gun is out of phase with the director to assume control of said power unit and cause movement of the gun back into substantially phased relation with the director, and means for selectively, operatively coupling the respective rotors for control of the variable speed power unit.

40. In a mechanism for driving an object in accordance with the movements of another object, the combination comprising a movable object, a driven object, variable-speed, power-driven, operating means for the driven object, a control for the driving means including a movable control element adapted upon moving to effect a change in the speed of the driving means, a hydraulically operated plunger, a hydraulic medium between the plunger and the movable control element, and a pilot valve for controlling the movement of the plunger, and means for actuating the pilot valve in accordance with the relative movement of the movable and driven objects.

41. In a mechanism for driving an object in accordance with the movements of another object, the combination comprising a movable object, a driven object, variable speed power driven operating means for the driven object, and control for the driving means including a movable control element adapted upon moving to effect a change in the speed of the driving means, a hydraulically reciprocable member, means hydraulically coupling the member and movable control element for determining actuation of the element on movement of the member, a pilot valve mechanism for controlling the movement of the member, and means for varying the operative effect of the pilot valve in accordance with the relative movement of the movable and driven objects.

42. In a gun control mechanism, the combination of a power unit coupled to the gun for effecting angular movement thereof, a control member for said unit for determining movement thereof, fluid operable means for shifting said member, a communication system including a receiver unit comprising a rotor, a hydraulic pressure differentiator directly coupled with the rotor for proportionate actuation thereby, means hydraulically coupling said differentiator to the fluid operable means whereby signals received by said unit will be translated into movement of said control member.

43. In a gun training and control mechanism, the combination of a power unit coupled to the gun for actuation thereof, of a communication system whereby the desired adjustment of the gun may be transmitted over long distances, said system terminating in a sensitive rotor of the Selsyn type, and a hydraulic amplification system including a valve member directly operable by and in proportion to the movement of said rotor, and a hydraulic power amplification system intervening the valve and the power unit to the gun for varying the action of the power unit to adjust the gun in accordance with the impulses transmitted to the rotor by the communication system.

44. In a gun control mechanism having a power operable unit for effecting translation of the gun and a signaling system for transmitting gun ranges from a remote control point, including a transmitter and receivers, the combination of fluid operable means for controlling the rate and direction of operation of the power unit by the receiver including a pair of pressure control channels, valve mechanism for determination of pressure difference in the channels, means operable when a major difference exists between the positioning of the transmitter and receiver and the gun to adjust the valve mechanism to effect a sudden pressure differential in said channels and thereby a rapid movement of the gun, and additional means operable when minor differences exist between the transmitter and receiver and the gun to vary the pressure difference in said channels in accordance with the said minor differences as existing between transmitter and receiver.

45. In a gun control mechanism having a power operable unit for effecting translation of the gun and a signaling system for transmitting gun ranges from a remote control point, including a transmitter and receivers, the combination of fluid operable means for controlling the rate and direction of operation of the power unit by the receiver including a pair of pressure controlled channels, valve mechanism for determination of pressure conditions in the channels, means operable when a major difference exists between the positioning of the transmitter and receivers and the gun to adjust the valve mechanism to effect a sudden pressure differential in said channels and thereby a rapid movement of the gun, additional means operable when minor differences exist between the transmitter and receiver and the gun to vary the pressure in said channels in accordance with the said minor differences as existing between transmitter and receiver, and means for selectively determining the operative effect of the respective pressure differential determinators.

46. In a gun control mechanism, the combination with a power operable unit connected with the gun for effecting adjustment thereof and a communication system including a director, receiving means operated by said director, feed-back means operable in step with the gun disposed in cooperating relationship with said receiving means, of means coupling the receiving means to said power operable unit for determining the rate and direction of movement thereof, including a fluid operable member, dual hydraulic actuation controls for said member, a source of fluid pressure, hydraulic amplification means between said controls and the member, one of said controls being unresponsive to small movements of the receiving means whereby the other receiving means will assume control of said unit, and means responsive to a large variation in the position of said receiving and feed-back means to cause the first-mentioned hydraulic actuation control to assume control and render the second-mentioned control inoperative as respects adjustment of the fluid operable member.

47. In a gun control mechanism, the combination with a power operable unit connected with a gun for effecting adjustment thereof, and a communication system including a director, receiving means operated by said director, and a feed-back mechanism mechanically coupled with the gun and cooperating with the receiving mechanism, of means coupling the receiving mechanism to said power operable unit for determining the rate and direction of movement thereof including a fluid operable rate adjuster, and control means for said rate adjuster including a primary hydraulic valve coupled with the receiving mechanism for proportional actuation thereby in accordance with the difference in movements of the receiving and feed-back mechanisms, a secondary valve, means providing a hydraulic couple between the primary and secondary valves whereby movement of the former creates a pressure difference non-reactive as respects the former but producing motion of the latter, and additional means providing a hydraulic couple between said latter valve and the fluid operable rate adjuster.

48. A control mechanism for positioning of a gun or like movable object including a primary motor, an adjustable hydraulic transmission operable thereby, means coupling transmission with the movable object for shifting thereof, an adjustable member for determining the output rate of the hydraulic transmission, a fluid operable motor for adjusting said member, an auxiliary hydraulic system for determining the direction of actuation of said motor including a pressure operable valve mechanism, and a communication system for controlling the positioning of said valve mechanism including Selsyn operated means, cam means, a feed-back mechanism disposed in cooperative relation to said cam means, connections between the feed-back mechanism and the movable object transmission for actuation of the feed-back mechanism in predetermined relation to the shifting of the movable object, and operative connections including a hydraulic couple between the cam and valve mechanism for effecting actuation of the transmission adjusting motor in accordance with variations in the relative position of the Selsyn and feed-back mechanisms.

49. A control mechanism for positioning of a gun or like movable object including a primary motor, an adjustable hydraulic transmission operable thereby, means coupling transmission with the movable object for shifting thereof, an adjustable member for determining the output rate of the hydraulic transmission, a fluid operable motor for adjusting said member, an auxiliary hydraulic system for determining the direction of actuation of said motor including a pressure operable valve mechanism, and a communication system for controlling the positioning of said valve mechanism including Selsyn operated means, cam means, a feed-back mechanism disposed in cooperative relation to said cam means, connections between the feed-back mechanism and the movable object transmission for actuation of the feed-back mechanism in predetermined relation to the shifting of the movable object, operative connections including a hydraulic couple between the cam and valve mechanism for effecting actuation of the transmission adjusting motor in accordance with variations in the relative position of the Selsyn and feed-back mechanisms, additional feed-back mechanism operable at a different ratio from the first, and means operable thereby on pronounced variance in position of the first feed back and Selsyn for taking over control of the transmission adjusting motor.

50. In combination with a self-synchronous transmission system comprising a transmitter and a receiver, a servo-motor mechanism comprising a plurality of nozzles constituting a valve mechanism, a fluid pressure system for supplying fluid under pressure to said nozzles, said receiver having a member cooperating with said nozzles to cover and uncover the same, supports for said member and said nozzles, respectively, whereby said member and said nozzles may rotate continuously in either direction, a motor, and means actuated by the unequal reaction pressures in said fluid pressure system when said receiver means covers said nozzles unequally for actuating said motor.

51. In combination with a self-synchronous transmission system comprising a transmitter and a receiver, a servo-motor mechanism comprising a plurality of nozzles constituting a valve mechanism, a fluid pressure system for supplying fluid under pressure to said nozzles, said receiver having a member cooperating with said nozzles to cover and uncover the same, supports for said member and said nozzles, respectively, whereby said member and said nozzles may rotate continuously in either direction, a motor, means actuated by the unequal reaction pressures in said fluid pressure system when said receiver means covers said nozzles unequally for actuating said motor, and a follow-up from said motor to said nozzle.

52. In combination with a self-synchronous transmission system comprising fine and coarse transmitters and fine and coarse receivers, a servo-motor mechanism comprising a plurality of sets of nozzles constituting valve mechanisms, a fluid-pressure system for supplying fluid under pressure to said nozzles, said receivers each having a member cooperating with the respective set of nozzles to cover and uncover the same, supports for said members and said nozzles, respectively, whereby said members and said nozzles may rotate continuously in either direction, a motor, and means actuated by the unequal reaction pressures in said fluid pressure system when said receiver means cover said nozzles in each set unequally for actuating said motor.

53. In combination with a self-synchronous transmission system comprising fine and coarse transmitters and fine and coarse receivers, a servo-motor mechanism comprising a plurality of sets of nozzles constituting valve mechanisms, a fluid pressure system for supplying fluid under pressure to said nozzles, said receivers each having a member cooperating with the respective set of nozzles to cover and uncover the same, supports for said members and said nozzles, respectively, whereby said members and said nozzles may rotate continuously in either direction, a motor, means actuated by the unequal reaction pressures in said fluid pressure system when said receiver means cover said nozzles in each set unequally for actuating said motor, and a follow-up from said motor to said sets of nozzles.

54. A hydraulic control system for positional adjustment of a gun or the like in accordance with Selsyn transmitted directives, including a Selsyn actuable sensitive valve, a hydraulically operable rate adjuster, a control valve for determining the rate, direction and extent of actuation of the rate adjuster, a first hydraulic circuit intervening the control valve and rate adjuster, a second hydraulic circuit intervening the sensitive and control valves and means reacting on said second circuit to maintain constant the proportionate rate and extent of movement of the respective valves.

55. In a gun control mechanism of the character described, the combination with a Selsyn transmission system, of a sensitive valve device coupled therewith for direct operation thereby, a second valve, a hydraulic amplification system between said device and said valve whereby minute movements of the device are proportionately transmitted to the valve, a hydraulically operable rate adjuster, and a power actuating circuit for said rate adjuster including said valve and controlled by movements of the valve, whereby the rate of actuation of the adjuster is determined by the Selsyn effected adjustment of the valve device.

56. In a gun control mechanism of the character described, the combination with a Selsyn transmission system, of a sensitive valve device coupled therewith for direct operation thereby, a second valve, a hydraulic amplification system between said device and said valve whereby minute movements of the device are proportionately transmitted to the valve, a hydraulically operable rate adjuster, a power actuating circuit for said rate adjuster including said valve and controlled by movements of the valve, whereby the rate of actuation of the adjuster is determined by the Selsyn effected adjustment of the valve device, a transmission drive controlled by said rate adjuster, and feed back means operated by said drive for counteracting the Selsyn adjustment of the valve device, substantially as and for the purpose described.

57. The combination with a gun control mechanism comprising a variable speed transmission including a rate adjuster for effecting power movements of the gun and a director system including a Selsyn device positionable in accordance with the movement it is desired to impart through the transmission to the gun, of an accurate control mechanism intervening the Selsyn and the rate adjuster including a Selsyn operated sensitive valve displaceable by the Selsyn in proportion to its positional displacement, a second valve shiftable in synchronism with said sensitive valve, a hydraulic amplification circuit intervening said valves and controlled by the first for power shifting of the second in predetermined ratio to movement of the first, a hydraulic power circuit intervening said second valve and the rate adjuster of the transmission for effecting adjustment thereof at varying rates, dependent on the extent of Selsyn determined displacements of the valve, and a feed back mechanism operable by the transmission for counteracting the Selsyn determined adjustment of the sensitive valve.

58. A mechanism of the character described including a prime mover, a transmission actuable thereby, an intervening speed variator having a rate determinator adjustable at and for an infinite variety of speeds, a variable speed motor for adjusting said rate determinator, a transmission feed back coupled to neutralize the rate determinator adjustment, a Selsyn, a valve device coupled therewith and operable thereby in accordance with the extent of displacement of the Selsyn, a controller for the variable speed motor and a hydraulic couple between the valve and controller for variably determining the rate of adjustment of the rate determinator in accordance with the extent of displacement of the Selsyn actuated valve.

59. A mechanism of the character described including a prime mover, a transmission actuable thereby, an intervening speedy variator having a rate determinator adjustable at and for an infinite variety of speeds, a variable speed motor for adjusting said rate determinator, a transmission feed back coupled to neutralize the rate determinator adjustment, a Selsyn receiver mechanism including a pair of relatively adjustable members, a valve device coupled therewith and displaceable thereby to an extent determined by out of phase adjustment of the respective members of the Selsyn receiver, a controller for the variable speed motor, a hydraulic couple between the valve and controller for variably determining the rate of adjustment of the rate determinator in accordance with the amount of out of phase positioning of the Selsyn receiver elements.

60. A mechanism of the character described including a prime mover, a transmission actuable thereby, an intervening speed variator having a rate determinator adjustable at and for an infinite variety of speeds, a variable speed motor for adjusting said rate determinator, a transmission feed back coupled to neutralize the rate determinator adjustment, a Selsyn receiver mechanism including a pair of relatively adjustable members, a valve device coupled therewith and displaceable thereby to an extent determined by out of phase adjustment of the respective members of the Selsyn receiver, a controller for the variable speed motor, a hydraulic couple between the valve and controller for variably determining the rate of adjustment of the rate determinator in accordance with the amount of out-of-phase positioning of the Selsyn receiver elements, and a second feed back mechanism from the transmission coupled with one of said Selsyn members for counteracting the relative out-of-phase adjustment of said members.

61. A mechanism of the character described including a prime mover, a transmission actuable thereby, an intervening speed variator having a rate determinator adjustable at and for an infinite variety of speeds, a variable speed motor for adjusting said rate determinator, a transmission feed back coupled to neutralize the rate determinator adjustment, a Selsyn receiver mechanism including a pair of relatively adjustable members, a valve device coupled therewith and displaceable thereby to an extent determined by out-of-phase adjustment of the respective members of the Selsyn receiver, a controller for the variable speed motor, a hydraulic couple between the valve and controller for variably determining the rate of adjustment of the rate determinator in accordance with the amount of out-of-phase positioning of the Selsyn receiver elements, a second feed back mechanism from the transmission coupled with one of said Selsyn members for counteracting the relative out-of-phase adjustment of said members, and additional means for effecting a high speed adjustment of the variable speed motor for the rate determinator.

62. A mechanism of the character described including a prime mover, a transmission actuable thereby, an intervening speed variator having a rate determinator adjustable at and for an infinite variety of speeds, a variable speed motor for adjusting said rate determinator, a transmission feed back coupled to neutralize the rate determinator adjustment, a Selsyn receiver mechanism including a pair of relatively adjustable members, a valve device coupled therewith and displaceable thereby to an extent determined by out-of-phase adjustment of the respective members of the Selsyn receiver, a controller for the variable speed motor, a hydraulic couple between the valve and controller for variably determining the rate of adjustment of the rate determinator in accordance with the amount of out-of-phase positioning of the Selsyn receiver elements, a second feed back mechanism from the transmission coupled with one of said Selsyn members for counteracting the relative out-of-phase adjustment of said members, a second Selsyn control mechanism including a pair of relatively adjustable elements, and means activated by out-of-phase relative shifting of said members for effecting a high speed adjustment of the rate determinator.

63. A mechanism of the character described including a prime mover, a transmission actuable thereby, an intervening speed variator having a rate determinator adjustable at and for an infinite variety of speeds, a variable speed motor for adjusting said rate determinator, a transmission feed back coupled to neutralize the rate determinator adjustment, a Selsyn receiver mechanism including a pair of relatively adjustable members, a valve device coupled therewith and displaceable thereby to an extent determined by out-of-phase adjustment of the respective members of the Selsyn receiver, a controller for the variable speed motor, a hydraulic couple between the valve and controller for variably determining the rate of adjustment of the rate determinator in accordance with the amount of out-of-phase positioning of the Selsyn receiver elements, a second feed back mechanism from the transmission coupled with one of said Selsyn members for counteracting the relative out-of-phase adjustment of said members, a second Selsyn control mechanism including a pair of relatively adjustable elements, means activated by out-of-phase relative shifting of said members for effecting a high speed adjustment of the rate determinator, and an additional feed back mechanism from the transmission to one of said second Selsyn members for restoring the phase relationship of said members whereby high speed adjustment of the rate controller is discontinued.

64. A mechanism of the character described including a prime mover, a transmission actuable thereby, an intervening speed variator having a rate determinator adjustable at and for an infinite variety of speeds, a variable speed motor for adjusting said rate determinator, a transmission feed back coupled to neutralize the rate determinator adjustment, a Selsyn receiver mechanism including a pair of relatively adjustable members, a valve device coupled therewith and displaceable thereby to an extent determined by out-of-phase adjustment of the respective members of the Selsyn receiver, a controller for the variable speed motor, a hydraulic couple between the valve and controller for variably determining the rate of adjustment of the rate determinator in accordance with the amount of out-of-phase positioning of the Selsyn receiver elements, a second feed back mechanism from the transmission coupled with one of said Selsyn members for counteracting the relative out-of-phase adjustment of said members, a second Selsyn control mechanism including a pair of relatively adjustable elements, means activated by out-of-phase relative shifting of said members for effecting a high speed adjustment of the rate determinator, an additional feed back mechanism from the transmission to one of said second Selsyn members for restoring the phase relationship of said members whereby high speed adjustment of the rate controller is discontinued, and an interlock selectively determining the reactions of the respective Selsyns on the rate determinator.

65. In an apparatus for synchronizing a driven object with the movements of another object, the combination comprising a movable object, a driven object, a hydraulic motor for driving the driven object, a hydraulic pump directly connected to the motor, said pump including a movable swash plate, and means operative in response to relative movement of said movable and driven members for adjusting the swash plate of the hydraulic pump including a hydraulically operated member mechanically connected to the swash plate, and a control for said member differentially connected to the hydraulic motor and the movable object.

66. A control unit for variable speed power driven driving means comprising a movable element adapted upon movement to effect changes in the speed of the driving means, three motion receiving elements potentially effective for movement of said element, differentially coupled power actuating means responsive to each of said motion receiving elements, a selector for selectively rendering one of said movable elements ineffective, and means for rendering one of the remaining motion receiving elements ineffective whereby control of the movable element is relegated to said third motion receiving element.

67. A control unit for variable speed power driven driving means comprising a movable element adapted upon movement to effect changes in the speed of the driving means, three motion receiving elements potentially effective for movement of said element, differentially coupled power actuating means responsive to each of said motion receiving elements, a selector for selectively rendering one of said movable elements ineffective, and means for rendering one of the remaining motion receiving elements ineffective whereby control of the movable element is relegated to said third motion receiving element, at least one of said power amplifying means including a differentially controlled hydraulic circuit.

68. In a control system for variable speed power driven driving means having a movable control element adapted upon movement to effect changes in the speed of the driving means, the combination comprising means for moving said control element, control means for said control element moving means, actuating means for effecting the actuation of the control means, and a hydraulic differential interconnecting the driving means, the actuating means and said control means, whereby adjustment of the movable control element is variably determined by said differential.

69. In a control system for variable speed power driven driving means having a movable control element adapted upon movement to effect changes in the speed of the driving means, the combination comprising means for moving said control element, a control means for said control element moving means including a shiftable control device, a hydraulic differential interconnecting the element controlled driving means, the means for moving said control element and the shiftable control device incrementally to vary the position of the movable control element to a greater or less extent depending upon the value of the differential.

70. In a mechanism of the character described, the combination with a movable object and a Selsyn control system including a receiver, of means for imparting continuous movement at infinitely variable rates to the object in accordance with the directions of the Selsyn, said means including a first member movable in accordance with movements of the object and a second free moving member responsive to and shiftable by the slight power output of the Selsyn receiver, means associated with said elements for creating a hydraulic differential proportional to the relative out-of-phase positioning of said members, a variable speed power driven driving means for the movable object including a power operable control means for varying the rate and direction of operation of the driving means, and hydraulic amplification means controlled by said hydraulic differential for effecting amplified movement of the control means and thus a variance in the effectiveness of the driving means in proportion to the variance in the hydraulic differential.

HANS ERNST.